United States Patent
Lu et al.

(10) Patent No.: US 10,186,067 B2
(45) Date of Patent: Jan. 22, 2019

(54) METHOD AND APPARATUS FOR GENERATING PANORAMIC IMAGE WITH ROTATION, TRANSLATION AND WARPING PROCESS

(71) Applicant: ASPEED Technology Inc., Hsinchu (TW)

(72) Inventors: Chung-Yen Lu, Hsinchu (TW); Pei-Hen Hung, Hsinchu (TW); Jing-Chuan Chen, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 12 days.

(21) Appl. No.: 15/333,765

(22) Filed: Oct. 25, 2016

(65) Prior Publication Data
US 2018/0114348 A1    Apr. 26, 2018

(51) Int. Cl.
| | |
|---|---|
| *G06K 9/36* | (2006.01) |
| *G06T 11/60* | (2006.01) |
| *G06T 7/60* | (2017.01) |
| *G06T 7/00* | (2017.01) |
| *G06T 3/20* | (2006.01) |

(52) U.S. Cl.
CPC ............... *G06T 11/60* (2013.01); *G06T 3/20* (2013.01); *G06T 7/004* (2013.01); *G06T 7/60* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 5,633,951 A | * | 5/1997 | Moshfeghi | ........... G06K 9/6207 375/E7.084 |
| 9,317,336 B2 | * | 4/2016 | Alicherry | .............. G06F 9/5066 |
| 9,363,449 B1 | * | 6/2016 | Jiang | ...................... G06T 5/006 |

(Continued)

OTHER PUBLICATIONS

Paul Bourke, Workflow for creating 360 spherical (equirectangular) panoramas, http://paulbourke.net/miscellaneous/sphericalpano/.*

(Continued)

*Primary Examiner* — Andrae S Allison
(74) *Attorney, Agent, or Firm* — Muncy, Geissler, Olds & Lowe, P.C.

(57) ABSTRACT

A transform apparatus applied in an image processing system with an image capture module is disclosed. The transform apparatus comprises a geometry information detector, a parameter setup unit, a primitive assembly unit and a geometry processing circuit. The geometry information detector measures geometry information of the image capture module. The parameter setup unit calculates geometry parameters and determines whether to assert an enable signal according to the geometry information. The primitive assembly unit receives an original vertex list and the enable signal to generate a vertex/ID flow. The geometry processing circuit receives the geometry parameters and performs geometry transform operations over the vertex/ID flow in response to whether the first enable signal is asserted to generate a modified vertex list. The geometry information comprises at least one of a displacement and rotation angles of the image capture module.

49 Claims, 27 Drawing Sheets

(56) References Cited

U.S. PATENT DOCUMENTS

| | | | | |
|---|---|---|---|---|
| 9,621,770 | B2* | 4/2017 | Geerds | H04N 5/2252 |
| 2003/0068098 | A1* | 4/2003 | Rondinelli | G06T 3/0062 |
| | | | | 382/276 |
| 2003/0117488 | A1* | 6/2003 | Pierce | H04N 5/23238 |
| | | | | 348/48 |
| 2006/0023105 | A1* | 2/2006 | Kostrzewski | G06T 3/0018 |
| | | | | 348/335 |
| 2014/0002488 | A1* | 1/2014 | Summa | G06T 11/60 |
| | | | | 345/629 |
| 2014/0085295 | A1* | 3/2014 | Li | G06T 15/04 |
| | | | | 345/419 |
| 2014/0267596 | A1* | 9/2014 | Geerds | H04N 5/2252 |
| | | | | 348/38 |
| 2017/0302828 | A1* | 10/2017 | Geerds | H04N 5/2253 |
| 2017/0331986 | A1* | 11/2017 | Houba | H04N 5/2252 |

OTHER PUBLICATIONS

Ho et al, Automatic Mosaicking of 360 Panorama in Video Surveillance, Army Research Laboratory, Dec. 2008.*

Szeliski, Richard, and Heung-Yeung Shum. "Creating full view panoramic image mosaics and environment maps." Proceedings of the 24th annual conference on Computer graphics and interactive techniques. ACM Press/Addison-Wesley Publishing Co., 1997.*

Shum, Heung-Yeung, and Richard Szeliski. "Construction and refinement of panoramic mosaics with global and local alignment." Computer Vision, 1998. Sixth International Conference on. IEEE, 1998.*

Kazhdan, Michael, and Hugues Hoppe. "Metric-aware processing of spherical imagery." ACM Transactions on Graphics (TOG). vol. 29. No. 6. ACM, 2010.*

Sean Ho, Philip David, "Automatic generation of 360 degree panorama from image sequences," Proc. SPIE 7073, Applications of Digital Image Processing XXXI, 70731J (Sep. 15, 2008); doi: 10.1117/12.795121.*

Guofeng Zhang, Multi-Viewpoint Panorama Construction With Wide-Baseline Images, IEEE Transactions on Image Processing, vol. 25, No. 7, Jul. 2016 3099.*

R. I. Hartley. Self-calibration from multiple views of a rotating camera. In Third European Conference on Computer Vision (ECCV'94), vol. 1, pp. 471-478, Stockholm, Sweden, May 1994. Springer-Verlag.*

U.S. Appl. No. 15/211,732, filed Jul. 15, 2016.

* cited by examiner

US 10,186,067 B2

METHOD AND APPARATUS FOR GENERATING PANORAMIC IMAGE WITH ROTATION, TRANSLATION AND WARPING PROCESS

BACKGROUND OF THE INVENTION

Field of the Invention

The invention relates to panoramic imaging, and more particularly, to a method and apparatus for generating panoramic images with rotation, translation and warping process.

Description of the Related Art 360 degree panoramic images, also known as 360 panoramic images, full panoramic images, or spherical images, are video recordings of a real-world panorama, where the view in every direction is recorded at the same time, shot using an omnidirectional camera or a collection of cameras. A 360 degree panoramic image covers 360 degree field of view (FOV) horizontally and 180 degree vertically.

An equirectangular video is a commonly projection used in 360 video. A common example of equirectangular projection is a standard world map, which maps the surface of the world (a sphere) onto orthogonal coordinates. That is, equirectangular projection maps the latitude and longitude coordinates of a spherical globe directly onto horizontal and vertical coordinates of a grid. Image distortion is minimal at the equator, and infinite at the poles. The poles (Zenith, Nadir) are located at the top and bottom edge and are stretched to the entire width of the image.

Real-time digital image stabilization—also called electronic image stabilization (EIS)—is used in some conventional video cameras. This technique shifts the electronic image from frame to frame of video, enough to counteract the motion. It uses pixels outside the border of the visible frame to provide a buffer for the motion. This technique reduces distracting vibrations from videos by smoothing the transition from one frame to another.

What is needed is a method used in a 360 camera system to adopt digital image stabilization to lessen the camera shaking effect. What is further needed is a method for texture mapping combined with rotation and translation used in a 360 camera system to provide best quality for panoramic images.

SUMMARY OF THE INVENTION

In view of the above-mentioned problems, an object of the invention is to provide a transform apparatus capable of reducing the negative effects caused by rotation and translation (movement) of an image capture module during exposure.

One embodiment of the invention provides a transform apparatus applied in an image processing system having an image capture module. The transform apparatus comprises a geometry information detector, a parameter setup unit, a primitive assembly unit and a geometry processing circuit. The geometry information detector measures geometry information of the image capture module. The parameter setup unit calculates geometry parameters and determines whether to assert an enable signal according to the geometry information. The primitive assembly unit receives an original vertex list and the enable signal to generate a vertex/ID flow. The geometry processing circuit receives the geometry parameters and performs geometry transform operations over the vertex/ID flow according to whether the first enable signal is asserted to generate a modified vertex list. Each of the original vertex list and the modified vertex list comprises a plurality of vertices with their data structures that define a vertex mapping between a plurality of camera images from the image capture module and a panoramic image. The geometry information comprises at least one of a displacement and rotation angles of the image capture module. The vertex/ID flow comprises a plurality of groups of three vertices with their data structures.

Another embodiment of the invention provides a transform method applied in an image processing system having an image capture module. The method comprises: when the image capture module moves, performing transform operations over a vertex/ID flow until all vertices from the vertex/ID flow are processed to generate a modified vertex list. The step of performing the transform operations comprises: performing geometry transform operations over a current group of three input vertices with their data structures from the vertex/ID flow according to geometry parameters to generate coordinates of three temporary vertices on a panoramic image; and, measuring shortest distances along a specified axis among the three temporary vertices and their imaginary points to determine coordinates of three transformed vertices on the panoramic image. The modified vertex list comprises a plurality of vertices with their data structures that define a vertex mapping between a plurality of camera images from the image capture module and the panoramic image. The geometry parameters comprise at least one of a rotation matrix, an inverse rotation matrix and a displacement of the image capture module. The vertex/ID flow comprises a plurality of groups of three vertices with their data structures.

Another embodiment of the invention provides an image processing system that receives an original vertex list from a calibration system and generates a panoramic image. The system comprises an image capture module, a transform apparatus, an image processing apparatus and a video encoder. The image capture module generates the camera images; the transform apparatus generates a modified vertex list according to the original vertex list; the image processing apparatus performs rasterization, texture mapping and blending operations to form the panoramic image according to the modified vertex list; the video encoder for encoding the panoramic image. The transform apparatus comprises a geometry information detector, a parameter setup unit, a primitive assembly unit and a geometry processing circuit. The geometry information detector measures geometry information of the image capture module. The parameter setup unit calculates geometry parameters and determines whether to assert an enable signal according to the geometry information. The primitive assembly unit receives the original vertex list and the enable signal to generate a vertex/ID flow. The geometry processing circuit receives the geometry parameters and performs geometry transform operations over the vertex/ID flow according to whether the enable signal is asserted to generate a modified vertex list. Each of the original vertex list and the modified vertex list comprises a plurality of vertices with their data structures that define a vertex mapping between the camera images and the panoramic image. The geometry information comprises at least one of a displacement and rotation angles of the image capture module. The vertex/ID flow comprises a plurality of groups of three vertices with their data structures.

Another embodiment of the invention provides a geometry processing circuit applied in an image processing system having an image capture module. The geometry processing circuit comprises a geometry transform unit and a triangle assembly unit. The geometry transform unit sequentially performs geometry transform operations over a current group of three input vertices with their data structures according to geometry parameters to generate coordinates of three temporary vertices on a panoramic image. The triangle assembly unit measures shortest distances along a specified axis among the three temporary vertices and their imaginary points to determine coordinates of three transformed vertices on the panoramic image. The data structures define a vertex mapping between a plurality of camera images from the image capture module and the panoramic image. The geometry parameters comprise at least one of a rotation matrix, an inverse rotation matrix and a displacement of the image capture module.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
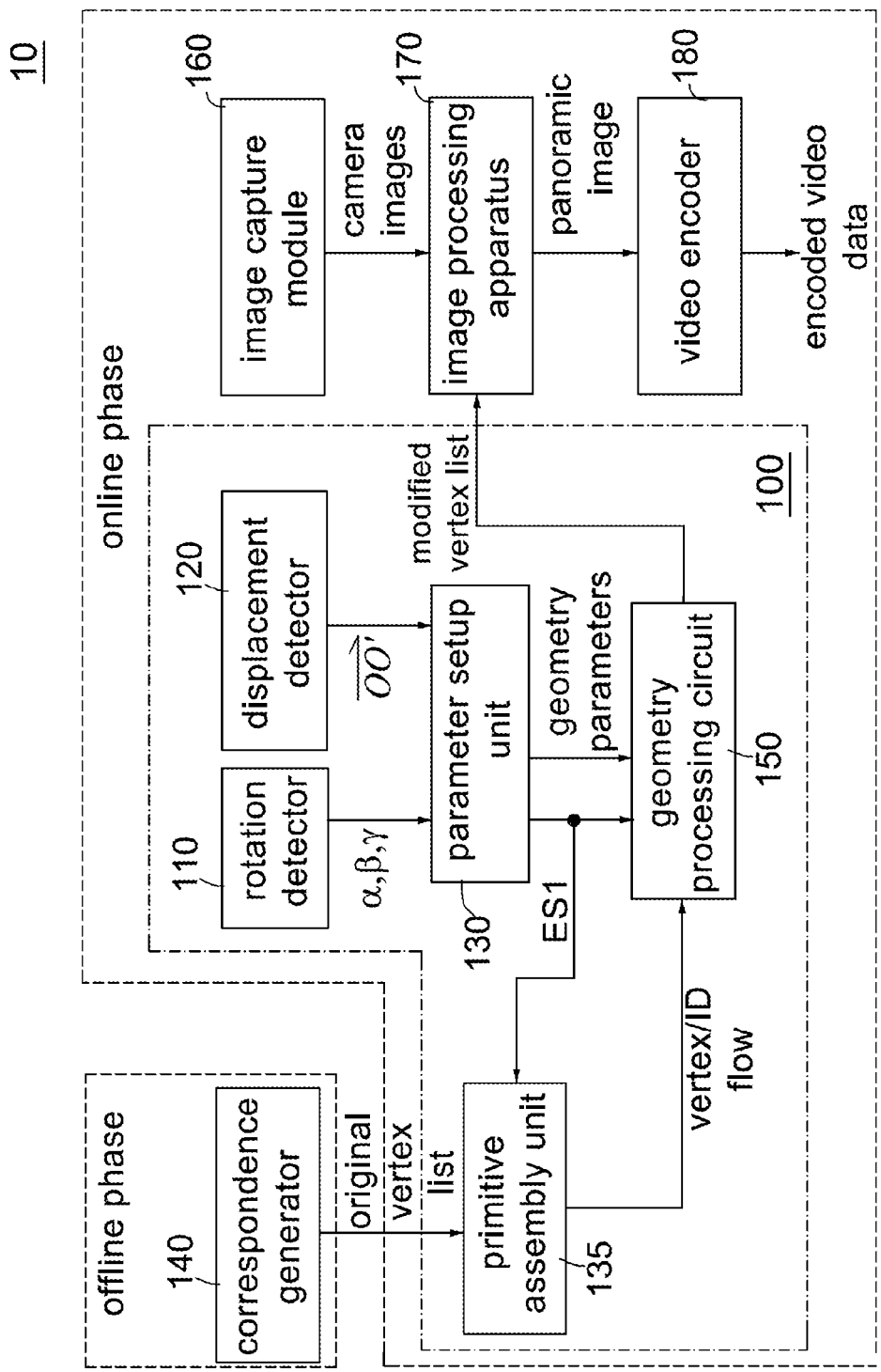
FIG. 1 is a diagram showing a panoramic image processing system of the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. The term "pole triangle" refers to a triangle with a vertex being a pole point (Zenith, Nadir) in a triangle mesh modeling a sphere surface. The term "triangle tessellation" refers to the division process for a triangle including a pole point. The term "inverse pole point" refers to a point on equirectangular domain and the point becomes one of a north pole and a south pole after geometry transform operations (will be described below) are performed, such as by the geometry transform unit 610. The equirectangular coordinates of two inverse pole points are obtained by performing inverse geometry transform operations over both of a north pole and a south pole (will be described below). Throughout the specification, the same components and/or components with the same function are designated with the same reference numerals.

A feature of the invention is to reduce the negative effects caused by rotation and translation (movement) of the image capture module 160 during exposure.

FIG. 1 is a diagram showing a panoramic image processing system of the invention. Referring to FIG. 1, the panoramic image processing system 10 includes a transform apparatus 100, an image capture module 160, an image processing apparatus 170, a video encoder 180, and a correspondence generator 140. The transform apparatus 100 includes a rotation detector 110, a displacement detector 120, a parameter setup unit 130, a primitive assembly unit 135 and a geometry processing circuit 150. The transform apparatus 100 receives an original vertex list and generates a modified vertex list (will be described later). The image capture module 160 is capable of capturing a view with 360 degree horizontal FOV and 180 degree vertical FOV to generate a plurality of camera images. After receiving the camera images from the image capture module 160, the image processing apparatus 170 performs rasterization, texture mapping and blending operations to form a panoramic image according to a modified vertex list. Finally, the video encoder 180 encodes the panoramic image and transmits the encoded video data. The detailed operations of the image capture module 160, the image processing apparatus 170, the video encoder 180, and the correspondence generator 140 are disclosed in U.S. application Ser. No. 15/211,732 (the disclosure of which is incorporated herein by reference in its entirety), and thus the descriptions are omitted herein.

Please note that the transform apparatus 100 operates in cooperation with at least one of the rotation detector 110 and the displacement detector 120.

Figure 2B:
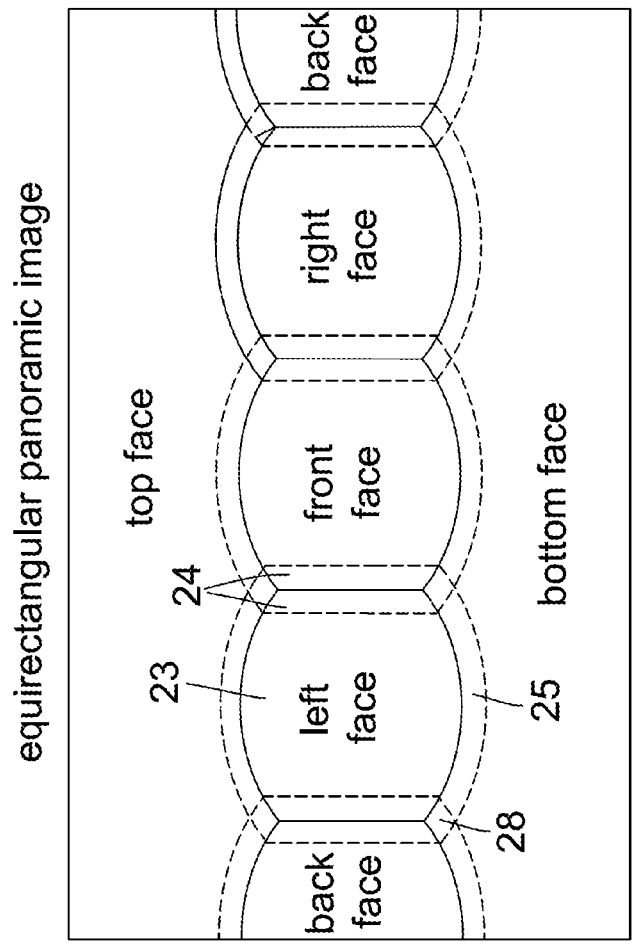
FIG. 2B shows an equirectangular panoramic image derived from an equirectangular projection of six-face camera images (top, bottom, right, left, front, back) from the image capture module 160.
Figure 2A:
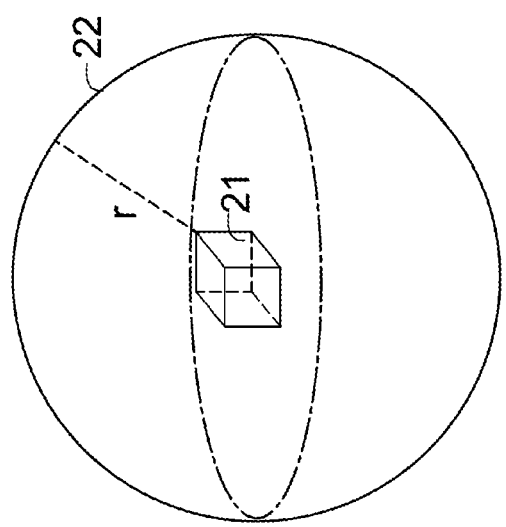
FIG. 2A shows a relation between a cube framework and a sphere.

In one embodiment, to capture a view with 360-degree horizontal FOV and 180-degree vertical FOV, the image capture module 160 includes a plurality of cameras. The cameras are properly placed so as to cover the system FOV up to 360 degree horizontally and 180 degree vertically. For example, as shown in FIG. 2A, the image capture module 160 includes six cameras (not shown) respectively mounted on the six faces of a cube framework 21 to simultaneously capture a view of the world with 360-degree horizontal FOV and 180-degree vertical FOV to generate six camera images. In an alternative embodiment, the image capture module 160 includes two fish-eye lens (not shown). A requirement is that there should be sufficient overlaps between the views of two adjacent cameras/lenses to facilitate the image mosaicking. Please note that the number of the cameras/fish-eye lenses is not limited as long as they are able to capture a FOV up to 360 degree horizontally and 180 degree vertically. Examples of the panoramic image include, without limitation, a 360 degree panoramic image and an equirectangular panoramic image.

For purposes of clarity and ease of description, hereinafter, the following examples and embodiments will be described with the equirectangular panoramic image and with the assumption that the image capture module 160 includes the six cameras respectively mounted on the six faces of the cube framework 21.

In order to store and display conveniently on computer screens, a spherical projection is mapped to an equirectangular panoramic image. Its aspect ratio is chosen to be 2:1, with the horizontal coordinate representing the azimuth angle $\theta \in -\pi \sim +\pi$, and the vertical coordinate representing the elevation angle $\varphi \in -\pi/2 \sim +\pi/2$. FIG. 2B shows an equirectangular panoramic image derived from an equirectangular projection of the six camera images from the six cameras of the image capture module 160. Referring to FIG. 2B, pixels in regions 28 are overlapping by three camera images and pixels in regions 24-25 are overlapping by two camera images while pixels in regions 23 comes from a single camera image. The image processing apparatus 170 need to perform blending operations over the overlapping regions for stitching the six camera images.

FIG. 1 also shows the processing pipeline of the panoramic image processing system 10. The processing pipeline is divided into an offline phase and an online phase. In the offline phase, the six cameras are calibrated separately. The correspondence generator 140 adopts appropriate image registration techniques to generate an original vertex list, and each vertex (with its data structure) in the original vertex list provides the mapping between the equirectangular panoramic image and camera images (or between the equirectangular coordinates and the texture coordinates). For example, the sphere 22 with 2 meter radius (r=2) is drawn in many circles as latitude and longitude, whose intersection points are treated as calibration points. The six cameras capture these calibration points, and their positions on camera images are known. Then the mapping relationship between the equirectangular panoramic image and camera images are constructed since the view angles of the calibration points and camera coordinates are linked. A calibration point with the mapping relationship is defined as a "vertex" in this invention. The correspondence generator 140 completes all necessary computations in the offline phase.

According to the geometry of the equirectangular panoramic image and camera images, the correspondence generator 140 computes equirectangular coordinates and texture coordinates for each vertex in a polygon mesh composing/modeling the equirectangular panoramic image to generate the original vertex list. Finally, the correspondence generator 140 supplies the original vertex list to the transform apparatus 100. Once the original vertex list is generated, it is repeated used by the transform apparatus 100 for generating a modified vertex list and the image processing apparatus 170 for receiving the modified vertex list and stitching subsequent camera images.

In an embodiment, the correspondence generator 140 is implemented with a processor and a memory (not shown). The memory stores a processor-executable program. When the processor-executable program is executed by the processor, the processor is configured to function as: the correspondence generator 140 that generates an original vertex list according to geometry of the equirectangular panoramic image and the camera images in offline phase.

In the online phase, minimal work is conducted to create the equirectangular panoramic image. According to the original vertex list, the image processing apparatus 170 may simply regard the subsequent camera images from the image capture module 160 as textures, map them onto the polygon mesh and stitch them together to form the equirectangular panoramic image in real time. Please note that fixing the view angles of the calibration points is a pre-requisite to use the original vertex list. Once the view angles of the calibration points are changed (e.g., the image capture module 160 is rotated/translated), a modified vertex list need to be generated (e.g., by the transform apparatus 100) in real-time. The invention deals with this issue.

Figure 3A:
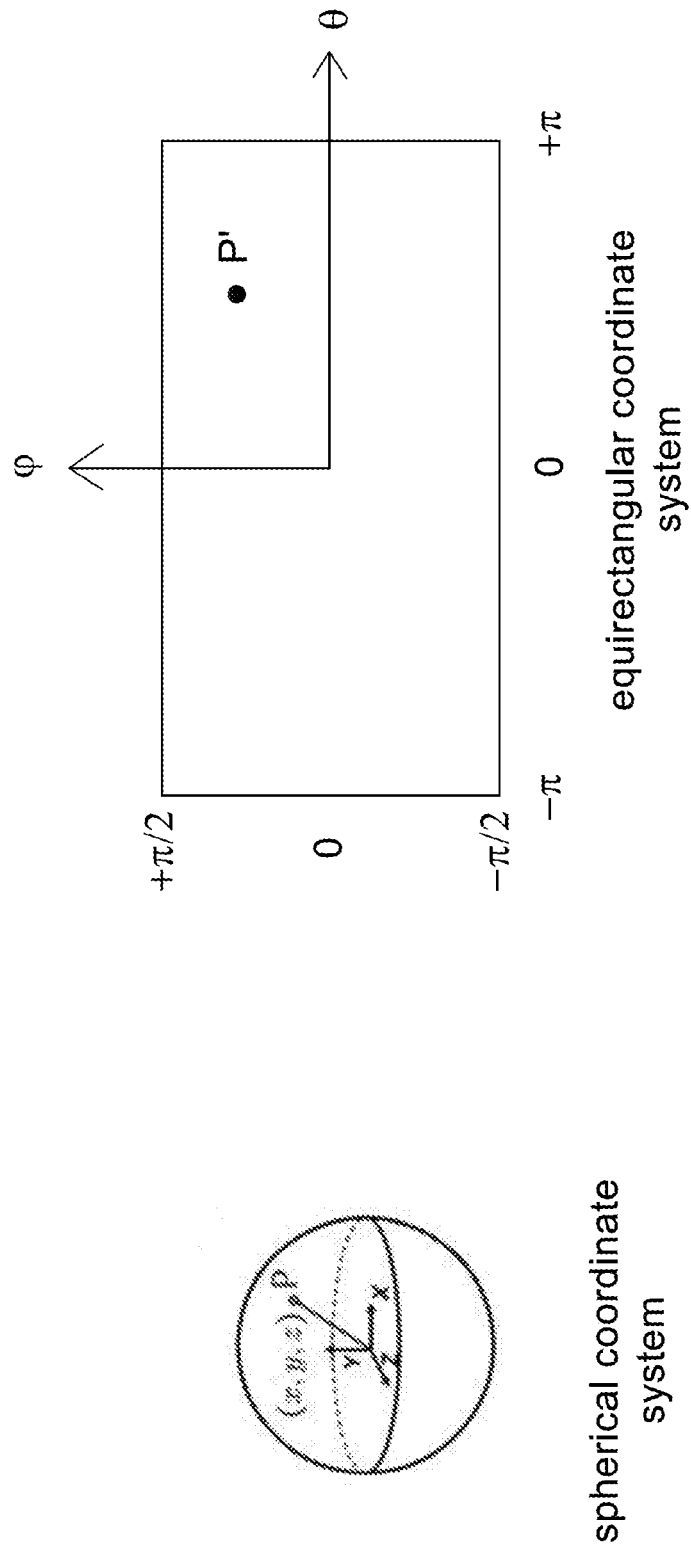
FIG. 3A shows a mapping relationship between a spherical coordinate system and an equirectangular coordinate system.

FIG. 3A shows a mapping relationship between a spherical coordinate system and an equirectangular coordinate system. Suppose a point P(x,y,z) is on the surface of unit sphere, and its spherical coordinates are (1, $\theta$, $\varphi$). Then, $x = \cos \varphi \cos \theta$, $y = \sin \varphi$, and $z = \cos \varphi \sin \theta$. The spherical projection is mapped to an equirectangular coordinate system and thus the point P (x,y,z) in spherical coordinate system corresponds to the point P' (θ,φ) in equirectangular coordinate system.

Figure 3C:
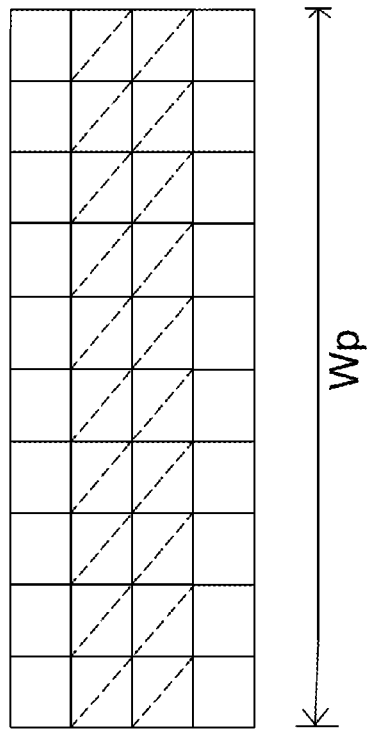
FIG. 3C shows a polygon mesh composing/modeling the equirectangular panoramic image.
Figure 3B:
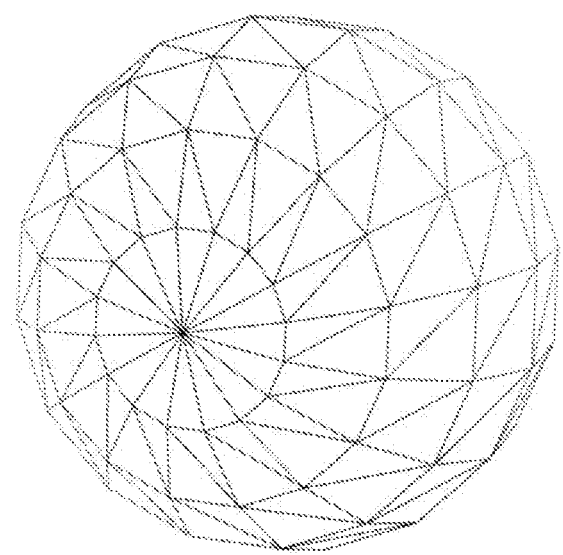
FIG. 3B shows a triangle mesh modeling a sphere surface.
Figure 3E:
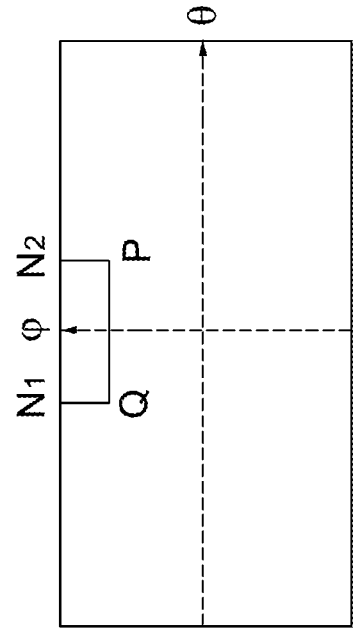
FIG. 3E shows a quadrilateral $PQN_1N_2$ by performing an equirectangular projection of the pole triangle PQN of FIG. 3D.
Figure 3D:
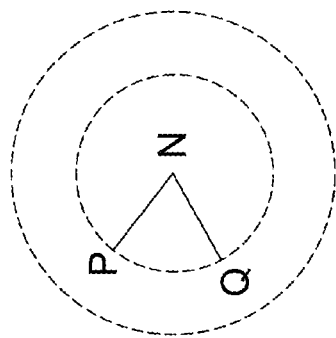
FIG. 3D shows a pole triangle PQN on the sphere surface.

FIG. 3B shows a triangle mesh modeling a sphere surface. The surface of the sphere 22 is modeled by using a triangle mesh as shown in FIG. 3B. Assuming that there is a pole triangle PQN on the sphere surface in FIG. 3D and its vertex N is a pole point. When the pole triangle PQN on the sphere surface in FIG. 3D is projected to the 2D equirectangular domain, the pole triangle PQN becomes a quadrilateral $PQN_1N_2$ in FIG. 3E. Specifically, after an equirectangular projection is performed, vertices P and Q respectively have equirectangular coordinates $(\theta_p,\varphi_p)$ and $(\theta_q,\varphi_q)$, and the pole point N is regarded as two points $N_1$ and $N_2$ with equirectangular coordinates $(\theta_p,\varphi_N)$ and $(\theta_q,\varphi_N)$ respectively, where $\varphi_p=\varphi_q$. FIG. 3C shows a polygon mesh composing/modeling the equirectangular panoramic image. The polygon mesh of FIG. 3C is produced by performing an equirectangular projection of the triangle mesh of FIG. 3B. The polygon mesh in FIG. 3C is a collection of quadrilaterals/triangles. Please note that only the top row and the bottom row of the polygon mesh in FIG. 3C are formed by quadrilaterals because they are projected from the pole triangles of the triangle mesh in FIG. 3B.

Figure 4B:
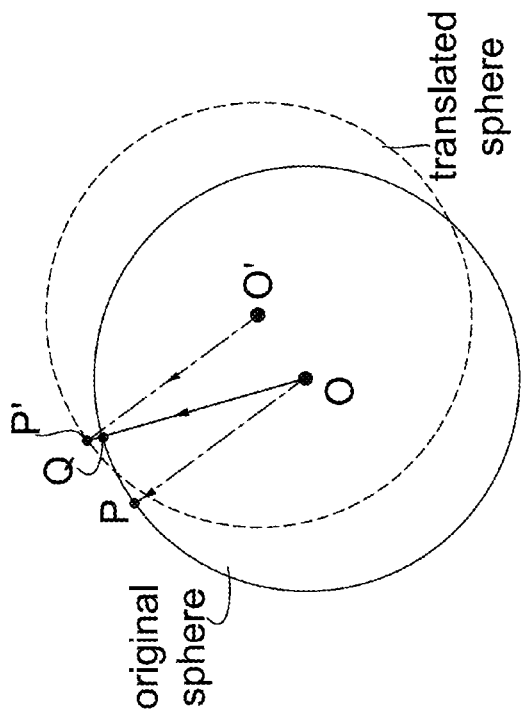
FIG. 4B shows an exemplary sphere translation.
Figure 4A:
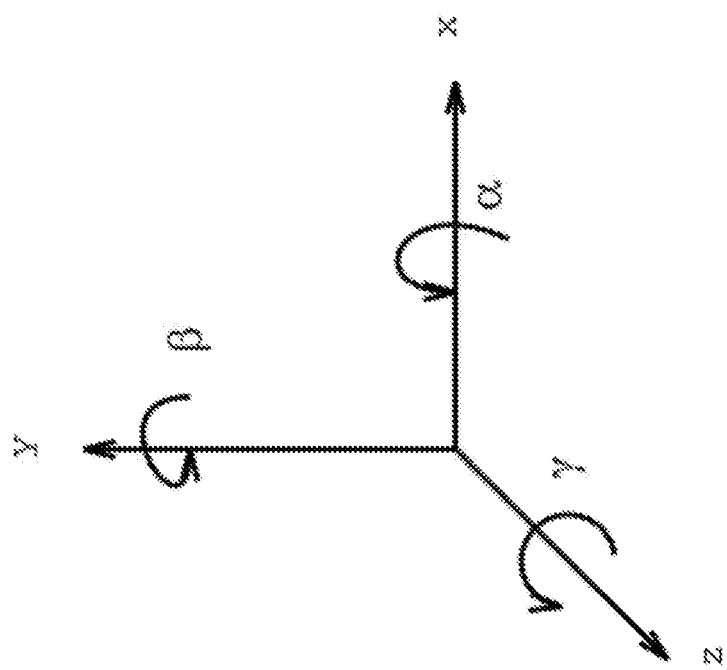
FIG. 4A shows a rotation with respect to three axes of a spherical coordinate system.

FIG. 4A shows a rotation with respect to three axes of a spherical coordinate system. A basic rotation is a rotation about at least one of the axes of the spherical coordinate system. The following three basic rotation matrices for the image capture module 160 rotate vectors by rotation angles α, β, γ about the x, y, z axes, respectively, using the right-hand rule—which codifies their alternating signs.

$$Rx(\alpha) = \begin{bmatrix} 1 & 0 & 0 \\ 0 & \cos\alpha & \sin\alpha \\ 0 & -\sin\alpha & \cos\alpha \end{bmatrix};$$

$$Ry(\beta) = \begin{bmatrix} \cos\beta & 0 & -\sin\beta \\ 0 & 1 & 0 \\ \sin\beta & 0 & \cos\beta \end{bmatrix};$$

$$Rz(\gamma) = \begin{bmatrix} \cos\gamma & \sin\gamma & 0 \\ -\sin\gamma & \cos\gamma & 0 \\ 0 & 0 & 1 \end{bmatrix};$$

$$\begin{bmatrix} x' \\ y' \\ z' \end{bmatrix} = RxRyRz \begin{bmatrix} x \\ y \\ z \end{bmatrix} = R_{3D} \begin{bmatrix} x \\ y \\ z \end{bmatrix}$$

(1)

Thus, the 3D rotation matrix $R_{3D}$ derived from three basic rotation matrices is given by: $R_{3D}=Rx\,Ry\,Rz$. Referring back to FIG. 1, the rotation detector 110 detects the rotation angles α, β, γ about the x, y, z axes for the image capture module 160 and sends the angles α, β, γ to the parameter setup unit 130.

FIG. 4B shows an exemplary sphere translation (movement). The point O is a center of an original sphere (i.e., the image capture module 160) before translation, and the point O' is the center of the translated sphere (i.e., the translated image capture module 160). A point P on the original sphere is translated to the point P' on translated sphere. Although the image capture module 160 is translated, the point P relative to the center O and the point P' relative to the center O' have the same texture coordinates. It is well known the spherical/equirectangular coordinates are related to the angles relative to the center O. Thus, calculating the spherical/equirectangular coordinates of the point P' relative to the center O is equivalent to calculating the spherical/equirectangular coordinates of the point Q relative to the center O, where the point Q is at the intersection of the vector $\overrightarrow{OP}$ and the perimeter of the original sphere. The displacement $\overrightarrow{OO'}$ is first measured by the displacement detector 120 and then we have $\overrightarrow{OP'}=\overrightarrow{OO'}+\overrightarrow{O'P'}=\overrightarrow{OO'}+\overrightarrow{OP}$ because the spherical/equirectangular coordinates of the point P relative to the center O is known. The spherical/equirectangular coordinates of the point Q relative to the center O ($\overrightarrow{OQ}$) is obtained by normalizing the magnitude of $\overrightarrow{OP'}$ to 1.

Referring again to FIG. 1, the displacement detector 120 measures the displacement $\overrightarrow{OO'}$ of the image capture module 160 and sends it to the parameter setup unit 130. In one embodiment, the displacement detector 120 can be implemented with g-sensor, accelerometer, or gyro-meter. In one embodiment, according to the rotation angles α, β, γ, the parameter setup unit 130 generates a rotation matrix $R_{3D}$ and an inverse rotation matrix $R_{3D}^{-1}$ by using equation (1). The parameter setup unit 130 also sends geometry parameters (including the rotation matrix $R_{3D}$ and the inverse rotation matrix $R_{3D}^{-1}$ and the displacement $\overrightarrow{OO'}$) to the geometry processing circuit 150. In addition, according to the rotation angles α, β, γ and the displacement $\overrightarrow{OO'}$, the parameter setup unit 130 determines whether the image capture module 160 moves (e.g., rotated/translated). For example, if the rotation angles are zero and the displacement is a zero vector, it indicates the image capture module 160 is not rotated/translated and the parameter setup unit 130 de-asserts an enable signal ES1. If at least one of the rotation angles is not zero and the displacement is a zero vector, it indicates the image capture module 160 is rotated, but not translated; the parameter setup unit 130 asserts the enable signal ES1. If the rotation angles are zero and the displacement is not a zero vector, it indicates the image capture module 160 is translated, but not rotated; the parameter setup unit 130 asserts the enable signal ES1. Then, the parameter setup unit 130 sends the asserted/de-asserted enable signal ES1 to the primitive assembly unit 135 and the geometry processing circuit 150. Here, the asserted enable signal ES1 is used to enable the geometry processing circuit 150.

Figure 5A:
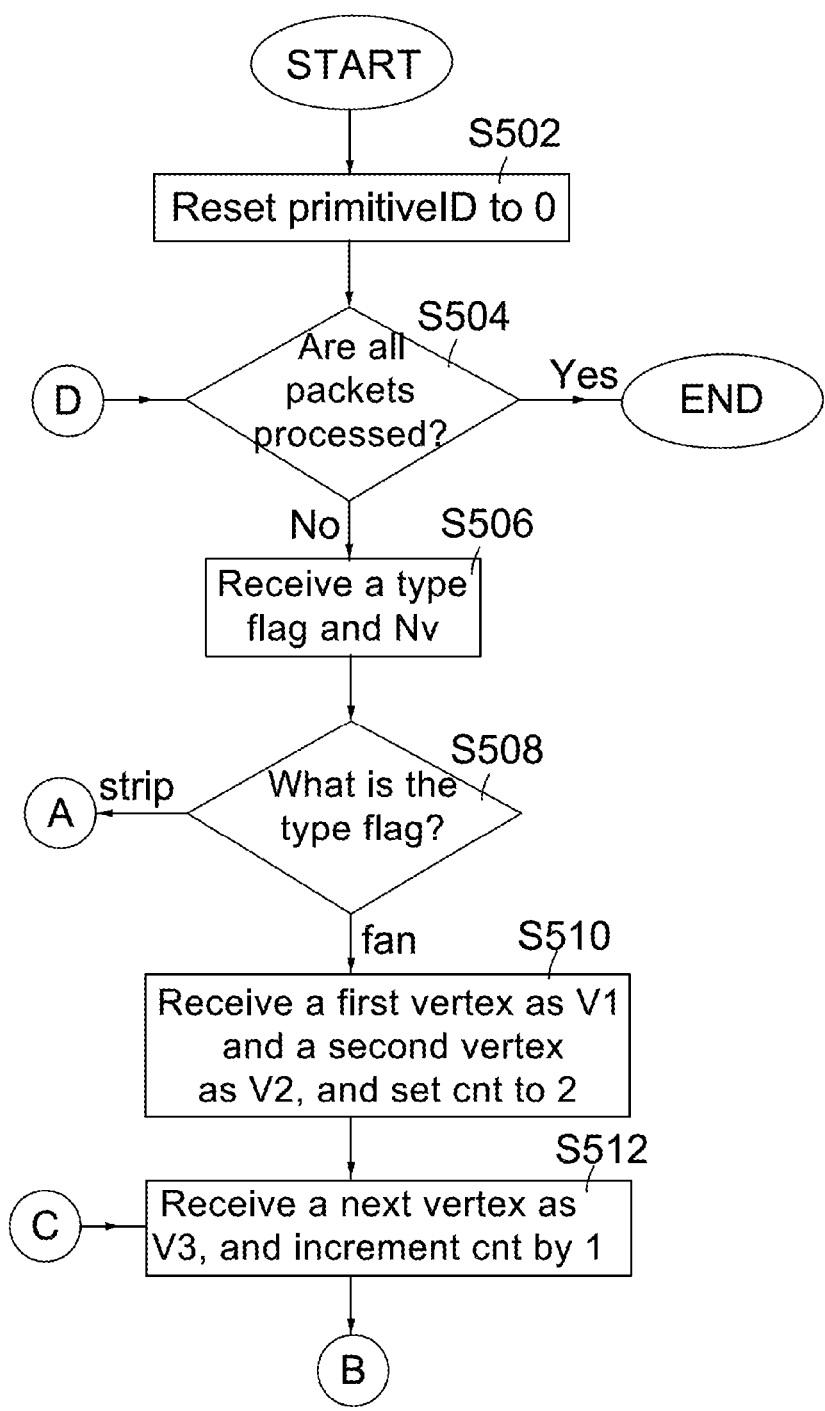
FIGS. 5A-5C illustrate a flow chart showing operations of the primitive assembly unit 135 according to an original vertex list and the enable signal ES1.
Figure 5B:
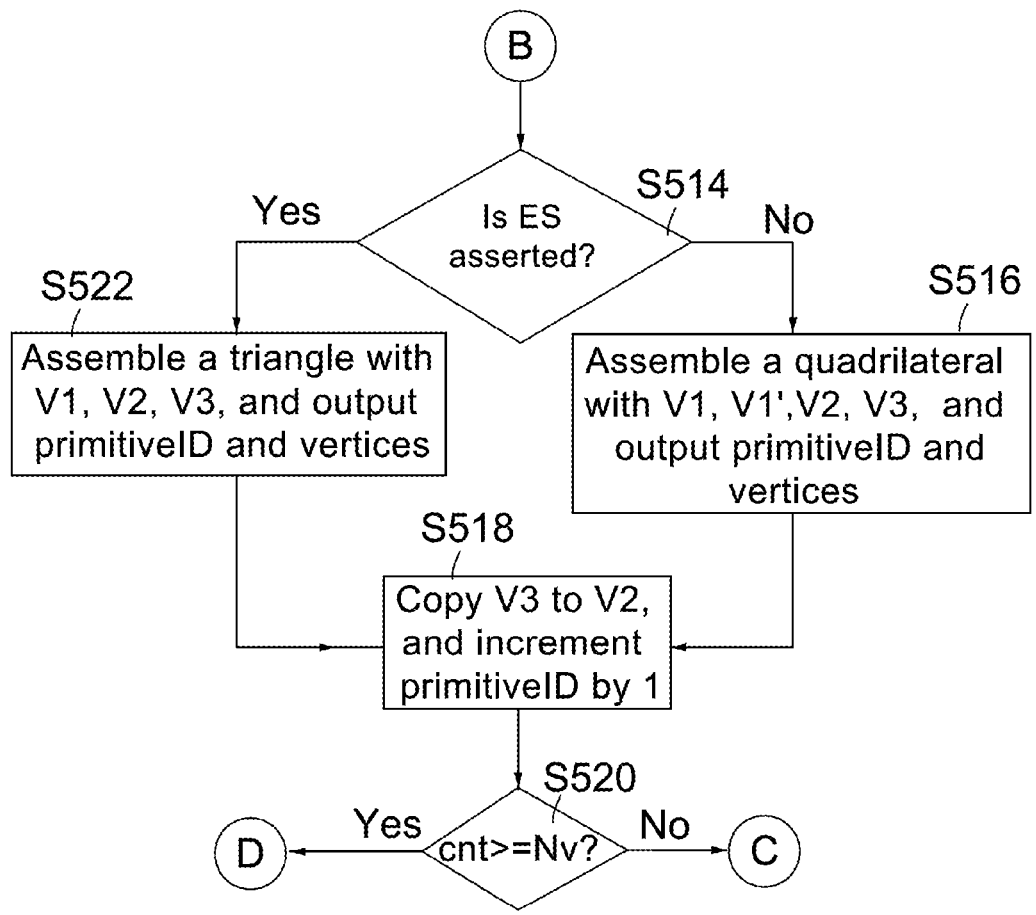
Figure 5C:
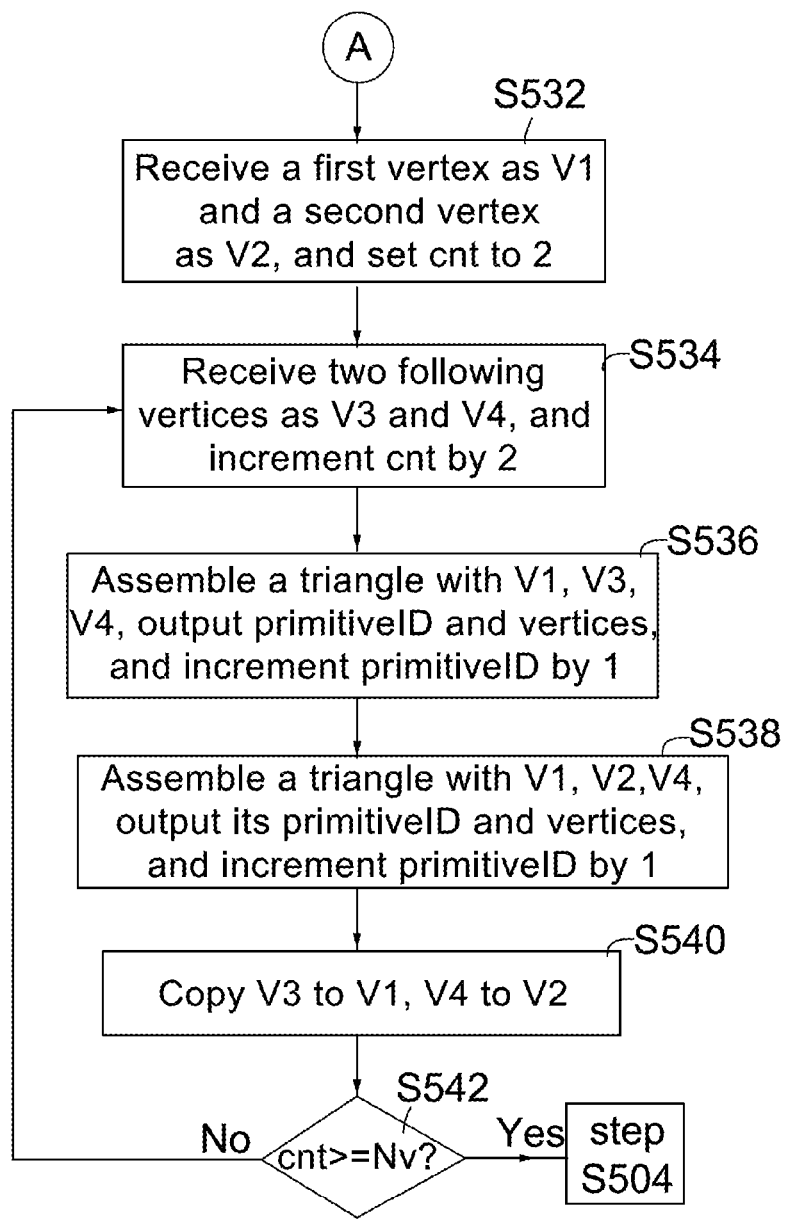

FIGS. 5A-5C are flow charts showing operations of the primitive assembly unit 135 according to an original vertex list and the enable signal ES1. As disclosed in U.S. application Ser. No. 15/211,732, the original vertex list is a list of a plurality of vertices forming a plurality of quadrilaterals of the polygon mesh (FIG. 3C) and each vertex is defined by its corresponding data structure. The data structure defines a vertex mapping between a destination space and a texture space (or between the equirectangular coordinates and the texture coordinates). In a first embodiment of the original vertex list, the data structure includes, without limitation, equirectangular coordinates, the pole flag, the number of covering/overlapping camera images, texture coordinates in each camera image, ID for each camera image and a blending weight for each camera image. Table 1 shows an exemplary data structure of each vertex in the vertex list.

TABLE 1

| Attributes | Descriptions |
| --- | --- |
| (x, y) | Equirectangular coordinates |
| N | Number of covering/overlapping camera images |
| Pole flag | Indicate whether the vertex is a pole point(e.g., 1: pole point; 0: not pole point) |
| $ID_1$ | ID of first camera image |
| $(u_1, v_1)$ | Texture coordinates in first camera image |
| $w_1$ | Blending weight for first camera image |
| ... | ... |
| $ID_N$ | ID of $N^{th}$ camera image |
| $(u_N, v_N)$ | Texture coordinates in $N^{th}$ camera image |
| $w_N$ | Blending weight for $N^{th}$ camera image |

Figure 5D:
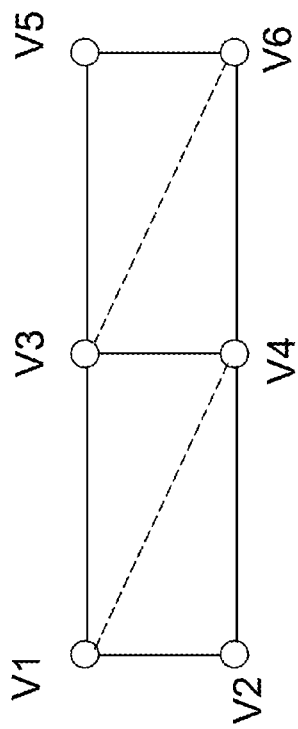
FIG. 5D shows two types of triangle meshes used in the original vertex list according to an embodiment of the invention.
Figure 5D:
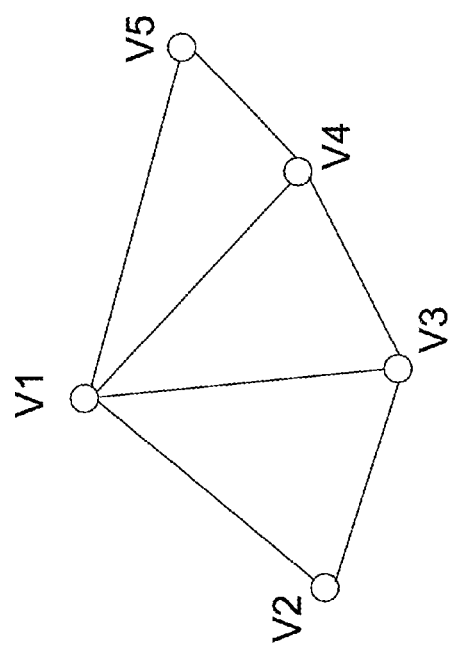

FIG. 5D shows two types of triangle meshes used in the original vertex list according to an embodiment of the invention. Referring to FIG. 5D, there are two types of triangle meshes used in the original vertex list: fan-type and strip-type. For example, the fan-type triangle mesh is applicable to the top row and bottom row of the polygon mesh as shown in FIG. 3C while the strip-type triangle mesh is applicable to the other rows of the polygon mesh. Please note that although the numbers (Nv) of vertices in the fan-type/strip-type triangle mesh are respectively five and six, they can be arbitrarily defined depending on different design needs. The original vertex list comprises a plurality of mesh packets, and each mesh packet consists of a header and a payload. The header consists of a type flag (indicating fan-type or strip-type) and a number Nv. The number Nv specifies there are Nv vertices (i.e., Nv data structures) contained in the payload or triangle mesh. Hereinafter, the operations of the primitive assembly unit 135 are described with reference to FIGS. 1, 3A-3E and 5A-5D. Assuming that, in advance, the correspondence generator 140 sends the original vertex list to the primitive assembly unit 135.

Step S502: Reset a parameter primitiveID to 0.

Step S504: Determine whether all mesh packets from the original vertex list are processed. If YES, the flow is terminated; otherwise, the flow goes to step S506.

Step S506: Receive a type flag and a number Nv. That is, a header of a mesh packet is received.

Step S508: Determine what the type flag is. If it is fan-type, the flow goes to step S510; if it is strip-type, the flow goes to step S532.

Step S510: Receive a first vertex as V1 and a second vertex as V2, and set a parameter cnt to 2.

Step S512: Receive a following vertex as V3 and increment cnt by 1.

Step S514: Determine whether the enable signal ES1 is asserted. If the enable signal ES1 is asserted, the flow goes to step S522; otherwise, the flow goes to step S516.

Step S516: Assemble a quadrilateral with vertices V1, V1', V2, V3, and output its primitiveID and primitive vertices V1, V1', V2, V3 with their data structures as a part of the vertex/ID flow. As mentioned above, the fan-type triangle mesh is applicable to the top row and bottom row of the polygon mesh. Thus, the vertex V1 is regarded as a pole point, and thus the vertex V1' is equivalent to the vertex V1. Since the enable signal ES1 is de-asserted, the vertices V1, V1', V2, V3 with their data structures and primitiveID will be bypassed to the image processing apparatus 170.

Step S518: Copy the vertex V3 to vertex V2 and increment primitiveID by 1. That is, the vertex V2 is replaced by the vertex V3.

Step S520: Determine whether cnt is greater than or equal to Nv. If YES, the flow goes to step S504; otherwise, the flow goes to step S512.

Step S522: Assemble a triangle with vertices V1, V2, V3, and output its primitiveID and primitive vertices V1, V2, V3 with their data structures as a part of the vertex/ID flow. Since the enable signal ES1 is asserted, the vertices V1, V2, V3 with their data structures and primitiveID will be processed by the geometry processing circuit 150.

Step S532: Receive a first vertex as V1 and a second vertex as V2, and set a parameter cnt to 2.

Step S534: Respectively receive two following vertices as V3, V4 and increment cnt by 2. In this case, the quadrilateral V1-V4 is divided into two triangles V1, V3, V4 and V1, V2, V4.

Step S536: Assemble a triangle with vertices V1, V3, V4, output its primitiveID and primitive vertices V1, V3, V4 with their data structures as a part of the vertex/ID flow, and then increment primitiveID by one.

Step S538: Assemble a triangle with vertices V1, V2, V4, output its primitiveID and primitive vertices V1, V2, V4 with their data structures as a part of the vertex/ID flow, and then increment primitiveID by one.

Step S540: Copy the vertex V3 to vertex V1, and the vertex V4 to vertex V2. That is, the vertex V1 is replaced by the vertex V3, and the vertex V2 is replaced by the vertex V4.

Step S542: Determine whether cnt is greater than or equal to Nv. If YES, the flow goes to step S504; otherwise, the flow goes to step S534.

According to FIGS. 5A-5C, the primitive assembly unit 135 receives the original vertex list and the enable signal ES1 to output a vertex/ID flow (including primitive vertices and primitiveIDs of triangles and quadrilaterals). Please note that the operating method of the primitive assembly unit 135 described in FIGS. 5A-5C cooperates with the geometry processing circuit 150A/B'/C in FIGS. 6B, 10B and 11 because the primitiveIDs of triangles and quadrilaterals are necessary for the geometry processing circuit 150A'/B'/C. By comparison, because there is no need for the geometry processing circuit 150A/B in FIGS. 6A and 10A to receive the primitiveIDs of triangles and quadrilaterals, there is no need for the operating method of the primitive assembly unit 135 described in FIGS. 5A-5C to process/generate the primitiveIDs of triangles and quadrilaterals.

Figure 6A:
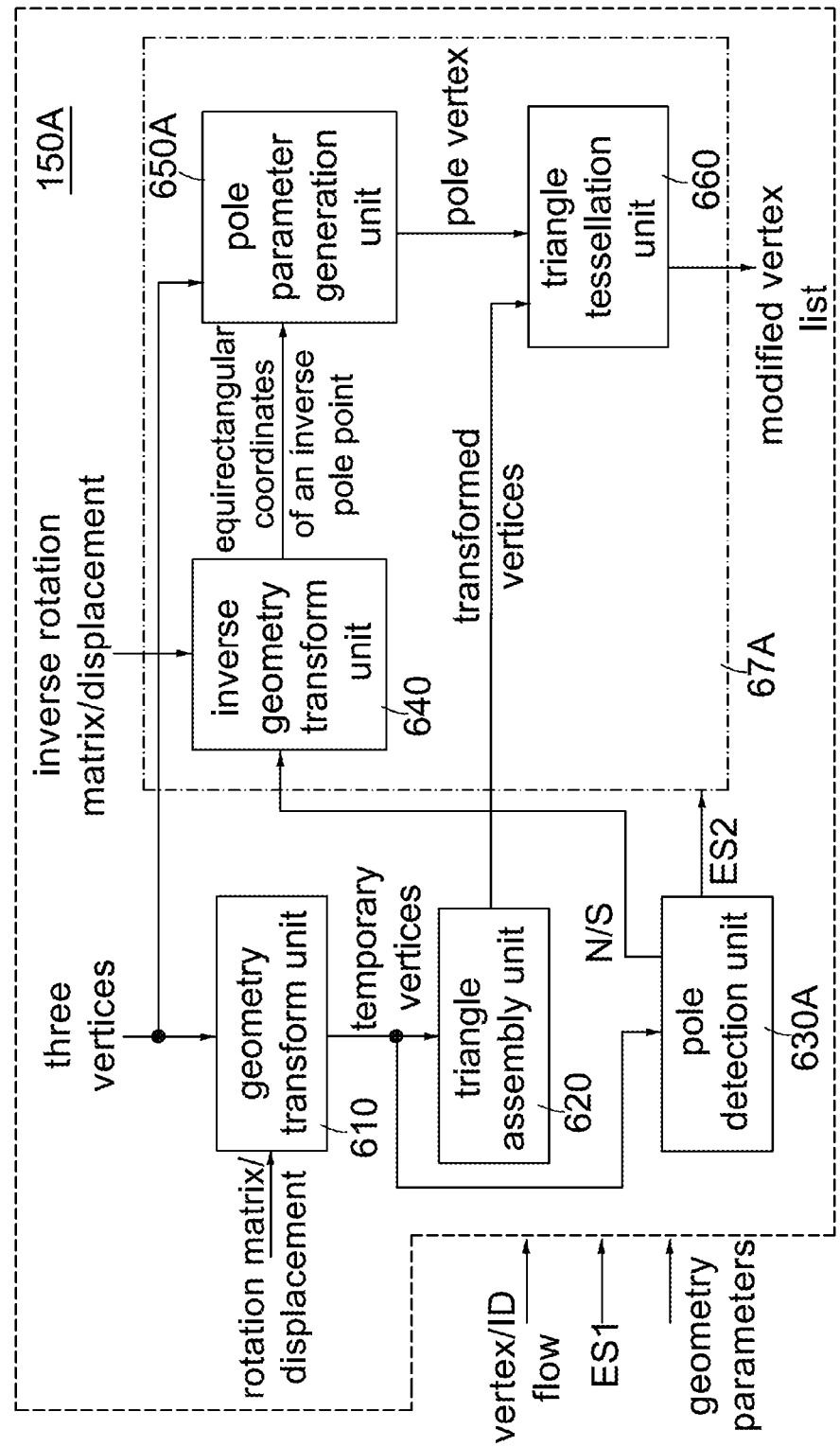
FIG. 6A is a block diagram of the geometry processing circuit according to one embodiment of the invention.

FIG. 6A is a block diagram of the geometry processing circuit 150A according to one embodiment of the invention. The geometry processing circuit 150A/B/C/A'/B' performs geometry transform, pole detection and triangle division operations over the input vertex/ID flow according to the enable signal ES1 and the geometry parameters to generate a modified vertex list.

Referring to FIG. 6A, the geometry processing circuit 150A comprises a geometry transform unit 610, a triangle assembly unit 620, a pole detection unit 630A, and a pole processing module 67A. The pole processing module 67A comprises an inverse geometry transform unit 640, a pole parameter generation unit 650A, and a triangle tessellation unit 660. The geometry processing circuit 150A/B/C/A/B' operates if the enable signal ES1 is asserted. If the enable signal ES1 is de-asserted, the geometry processing circuit 150A/B/C/A'/B' is disabled and the vertex/ID flow is bypassed to the image processing apparatus 170. Besides, three vertices from the vertex/ID flow are inputted to the geometry processing circuit 150A/B/C at a time.

According to at least one of the rotation matrix and the displacement, the geometry transform unit 610 sequentially performs geometry transform operations over each of input three vertices with their data structures from the vertex/ID flow to generate temporary equirectangular coordinates of three temporary vertices. Specifically, the geometry transform operations include the following sequential operations: (1) transform the original equirectangular coordinates of one vertex into first spherical coordinates; (2) map the first spherical coordinates to second spherical coordinates according to the displacement; (3) map the second spherical coordinates to third spherical coordinates according to the rotation matrix; (4) transform the third spherical coordinates into temporary equirectangular coordinates. Please note that steps (2) and (3) are interchangeable and optional. Finally, the geometry transform unit 610 updates the equirectangular coordinates of the data structure of each vertex with its temporary equirectangular coordinates to generate three temporary vertices.

Figure 7:
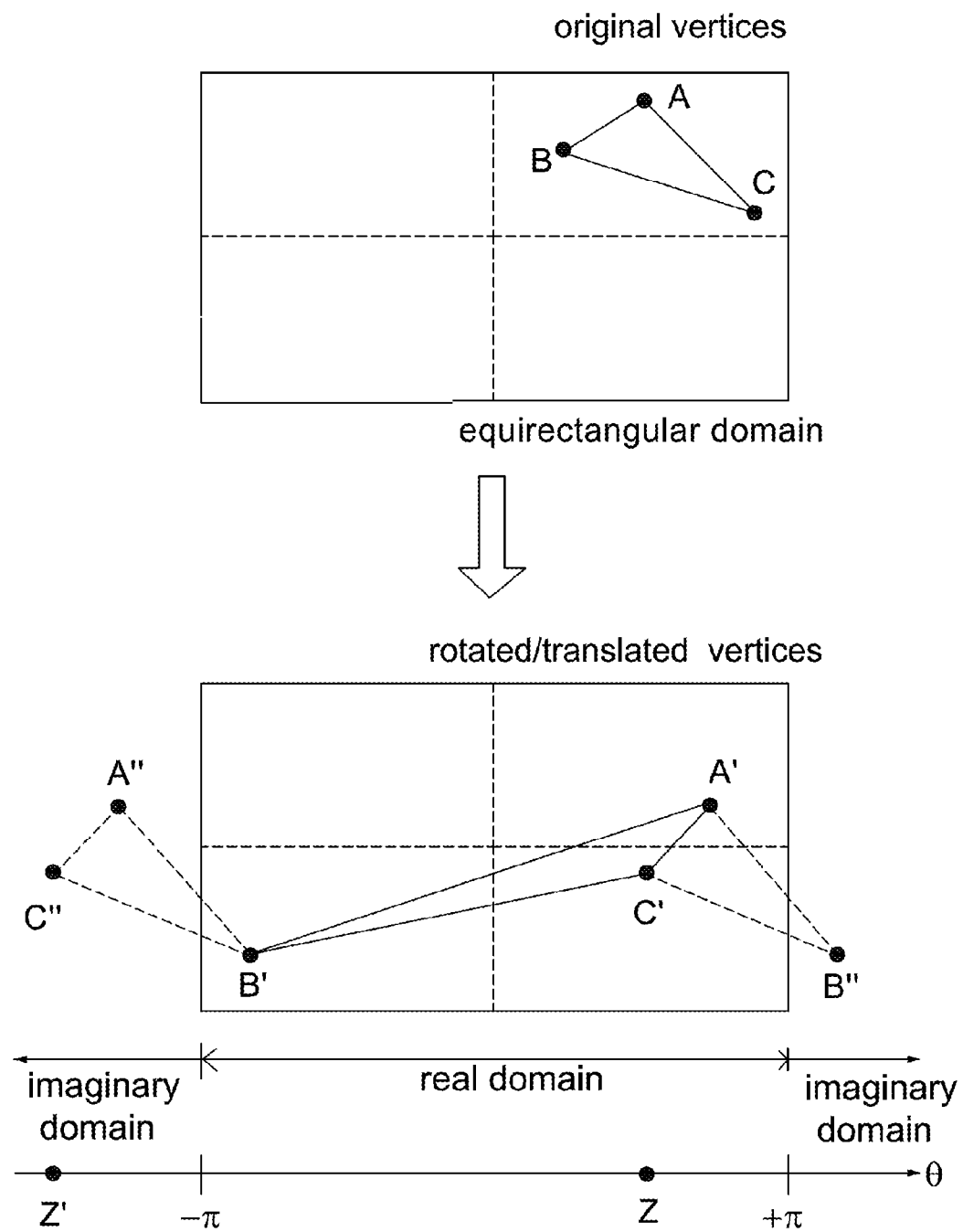
FIG. 7 shows exemplary vertex positions before/after rotation/translation of the image capture module 160 in equirectangular domain.

FIG. 7 shows exemplary vertex positions before/after rotation/translation of the image capture module 160 in equirectangular domain. Referring to FIG. 7, assuming that ΔABC in equirectangular domain is mapped from an original triangle Δabc (not shown) on the surface of an original sphere (i.e., the image capture module 160 before rotation/translation). After the image capture module 160 is rotated/translated, the vertices A, B, C are remapped (also called "geometry-transformed") to different temporary positions A', B', C' in equirectangular domain. In this example, the geometry transform unit 610 receives the data structures of the input vertices A, B, C, performs the geometry transform operations over the original equirectangular coordinates of the vertices A, B, C to obtain temporary equirectangular coordinates (corresponding to the temporary vertices A', B', C') by using at least one of the rotation matrix $R_{3D}$ and the displacement $\overrightarrow{OO'}$, updates the data structures of the vertices A, B, C with the temporary equirectangular coordinates and sends the updated data structures of the three temporary vertices A'B'C' to the triangle assembly unit 620.

Please note that because there are $2\pi$ radians along the whole θ-axis, each point at θ-axis occurs in a periodical manner (called "θ-axis periodic feature"). For example, referring to the lower part of FIG. 7, let a point Z with coordinates (θ,φ) in equirectangular coordinate system be a real point; due to the θ-axis periodic feature, its imaginary point Z' is defined by (θ',φ), where $$\theta' = \begin{cases} \theta - 2\pi, & \text{if } \theta \geq 0 \\ \theta + 2\pi, & \text{if } \theta < 0 \end{cases}.$$

Please also note that the point Z is equivalent to the point Z' along θ-axis. The feature of triangle assembly in the invention is to find the shortest distances along θ-axis among the remapped vertices (A', B', C') and their imaginary points (A", B", C") for the geometry-transformed triangle. After the triangle assembly is finished, the transformed/final vertices of the geometry-transformed triangle are determined. In one embodiment, referring to FIG. 7, to perform triangle assembly, the following program codes are provided in the triangle assembly unit 620 to determine the transformed/final vertices of the geometry-transformed triangle.

$\Delta_{A'B'} = |\theta_{A'} - \theta_{B'}|$;
$\Delta_{B'C'} = |\theta_{B'} - \theta_{C'}|$;
$\Delta_{C'A'} = |\theta_{C'} - \theta_{A'}|$;
if ($\Delta_{A'B'} \geq \pi$) { //point C' is a reference point.
    $\Delta_{C'A''} = |\theta_{C'} - \theta_{A''}|$;
    $\Delta_{B''C'} = |\theta_{B''} - \theta_{C'}|$;
    sA = $\Delta_{C'A''} < \Delta_{C'A'}$ ? 1: 0; //select 1 for imaginary point A", 0 for real point A'
    sB = $\Delta_{B''C'} < \Delta_{B'C'}$ ? 1: 0; //select 1 for imaginary point B", 0
for real point B'
    if (sA==1 & sB==1) ΔA"B"C'
    else if (sA==1 & sB==0) ΔA"B'C'
    else if (sA==0 & sB==1) ΔA'B"C'
    else     ΔA'B'C'
}
else { // points A', B' are reference points.
    $\Delta_{B'C''} = |\theta_{B'} - \theta_{C''}|$;
    sC = $\Delta_{B'C''} < \Delta_{B'C'}$ ? 1: 0; //select 1 for imaginary point C", 0
for real point C'
    if (sC) ΔA'B'C"
    else     ΔA'B'C'
}

In other words, the geometry-transformed triangle is one of ΔA"B"C', ΔA'B'C', ΔA'B"C', ΔA'B'C', and ΔA'B'C". Finally, the triangle assembly unit 620 updates the data structures of the temporary vertices A', B', C' with the equirectangular coordinates of the three transformed vertices of the geometry-transformed triangle and generates the data structures of the transformed vertices. Please note that after geometry transform and triangle assembly operations are completed, only the equirectangular coordinates in the data structures are modified while other parameters in the data structures are unchanged for the three input vertices A, B, C. In other words, assuming that the pole points are not taken into consideration, in comparison with the original vertex list, only the equirectangular coordinates in the data structures for all the vertices are modified in the modified vertex list after geometry transform and triangle assembly operations are completed.

Figure 8:
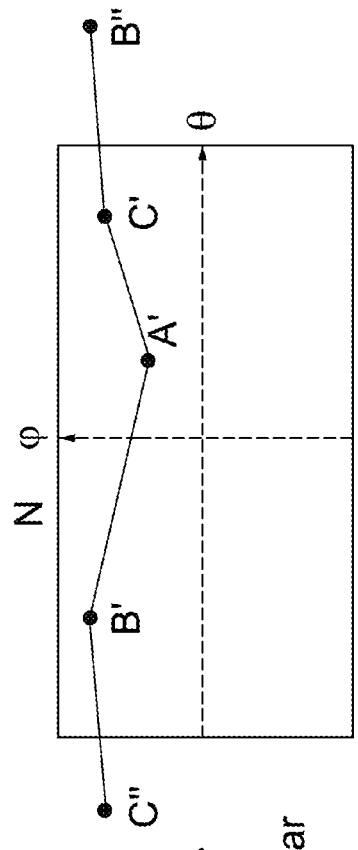
FIG. 8 shows an example that a front camera image changes into the top camera image after a 90-degree rotation of the image capture module 160.

After the geometry transform operations are performed, one issue is whether the temporary triangle formed by the three temporary vertices contains a pole point. FIG. 8 shows an example that a front camera image changes into the top camera image after a 90-degree rotation of the image capture module 160. Referring to the left side of FIG. 8, after the image capture module 160 is rotated 90 degrees, a triangle abc in the front camera image changes into the triangle a'b'c' in the top camera image containing a pole point N. Then, after an equirectangular projection of the top camera image is conducted, its equirectangular panoramic image is shown as the right side of FIG. 8. If its rasterization is directly performed according to the triangle A'B'C' in the equirectangular panoramic image, the rasterization definitely goes wrong because the triangle a'b'c' contains the pole point N. To ensure that the following rasterization in the image processing apparatus 170 is performed correctly, it is necessary to check whether a temporary triangle formed by the three temporary vertices contains a pole point and to determine whether to divide the transformed triangle into sub-triangles if the temporary triangle contains a pole point.

Figures 9A, 9B:
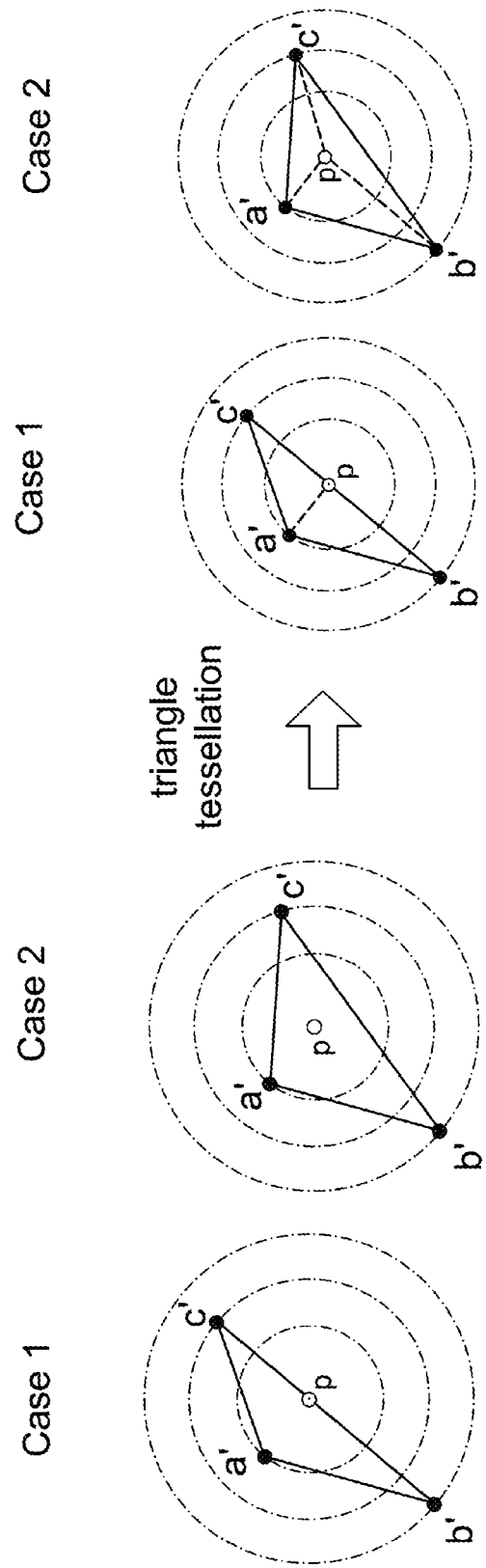
FIG. 9A illustrates two cases of how a triangle contains a pole point.
FIG. 9B illustrates how a triangle is divided into multiple regrouped triangles in the two cases after triangle tessellation is finished.

FIG. 9A illustrates two cases of how a triangle contains a pole point. Referring to FIG. 9A, one edge crosses the pole point in case 1; three vertices and three edges surround the pole point in case 2. After receiving the temporary vertices, the pole detection unit 630A conducts a pole inside test to determine whether the temporary triangle formed by the three temporary vertices contains a pole point. In one embodiment, the following program codes are provided in the pole detection unit 630A to conduct the pole inside test:

```
Bool pole_inside_test(Δθ_{a'b'}, Δθ_{b'c'}, Δθ_{c'a'}) {
    perimeter = Δθ_{a'b'} + Δθ_{b'c'} + Δθ_{c'a'};
    PI_flag = (perimeter==2π);
    return(PI_flag);
}
```

In other words, in either case 1 or 2, the condition "$Δθ_{a'b'}+Δθ_{b'c'}+Δθ_{c'a'}=2π$" is satisfied. Please note that none of vertices a', b' and c' is a pole point; $Δθ_{a'b'}$ denotes the shortest distance between two vertices a' and b' along θ-axis; $Δθ_{b'c'}$ denotes the minimum distance between two vertices b' and c' along θ-axis; $Δθ_{c'a'}$ denotes the minimum distance between two vertices c' and a' along θ-axis. If the temporary vertices fail the pole inside test (i.e., PI_flag is not equal to 1), it indicates no pole point is found and the pole detection unit 630A de-asserts an enable signal ES2. Responsive to the de-asserted enable signal ES2, the pole processing module 67A is disabled to bypass and output the transformed vertices with their data structures as a part of the modified vertex list. On the contrary, if the temporary vertices pass the pole inside test (i.e., PI_flag=1), it indicates a pole point is found; the pole detection unit 630A asserts an enable signal ES2, determines what the pole point (N/S) is according to equirectangular coordinates of the three temporary vertices and also sends an indication signal indicating a north/south pole point to the inverse geometry transform unit 640. Responsive to the asserted enable signal ES2, the pole processing module 67A is enabled. After receiving the indication signal indicating a north/south pole point, the inverse geometry transform unit 640 performs inverse geometry transform operations over the spherical/equirectangular coordinates of north/south pole point to obtain the equirectangular coordinates of an inverse pole point (to be the north/south pole) according to the inverse rotation matrix and the displacement. The inverse geometry transform operations include the following sequential operations: (1) map original spherical coordinates $(r,φ,θ)=(1, 90°, 0°)/(1, -90°, 0°)$ of the north/south pole point to first spherical coordinates according to the displacement; (2) map the first spherical coordinates to the second spherical coordinates according to the inverse rotation matrix; (3) transform the second spherical coordinates into equirectangular coordinates. These equirectangular coordinates belong to the inverse pole point (to be the north/south pole). Please note that steps (1) and (2) are interchangeable and optional.

After receiving the equirectangular coordinates of the inverse pole point, the pole parameter generation unit 650A performs interpolation operations over the three input vertices with their data structures according to equirectangular coordinates of the three input vertices and the inverse pole point to generate related parameters for the inverse pole point (to be the north/south pole), such as the parameters (e.g., number of covering/overlapping camera images, ID of each camera image, texture coordinates in each camera image, blending weight for each camera image) listed in Table 1. With the related parameters being generated, the data structure of the inverse pole point (corresponding to the north/south pole) is created, and thus the north/south pole is ready to become a pole vertex p later (as shown in FIG. 9B). Afterward, the pole parameter generation unit 650A sends the inverse pole point (i.e., the pole vertex p) with its data structure to the triangle tessellation unit 660.

To ensure that the following rasterization in the image processing apparatus 170 is performed correctly, if any triangle contains a pole point as shown in case 1 or 2, it needs to be divided into multiple regrouped triangles, in which the pole point becomes a pole vertex as shown in FIG. 9B. After receiving the three transformed vertices from the triangle assembly unit 620 and the pole vertex from the pole parameter generation unit 650A, the triangle tessellation unit 660 performs triangle division operations to output regrouped vertices for the multiple regrouped triangles as a part of the modified vertex list. As illustrated in FIG. 9B, after the triangle division is done, there are two pole triangles for case 1, and there are three pole triangles for case 2. The triangle tessellation unit 660 outputs one triangle at a time. For case 1, the triangle tessellation unit 660 sequentially outputs regrouped vertices a'b' p and a'c'p with their data structures for two regrouped triangles, i.e., three vertices at a time. Likewise, for case 2, the triangle tessellation unit 660 sequentially outputs regrouped vertices a'b' p, a'c'p and b'c'p with their data structures for three regrouped triangles, i.e., three vertices at a time. As stated above, in comparison with the original vertex list, the equirectangular coordinates in the data structures for all the vertices are modified in the modified vertex list. Besides, the number of the vertices in the modified vertex list is greater than or equal to the number of the vertices in the original vertex list depending on where the pole points fall after the camera image module 160 moves (rotated/translated). For example, if two of all the temporary vertices happen to be the two pole points, the number of the vertices in the modified vertex list is equal to the number of the vertices in the original vertex list.

Figure 6B:
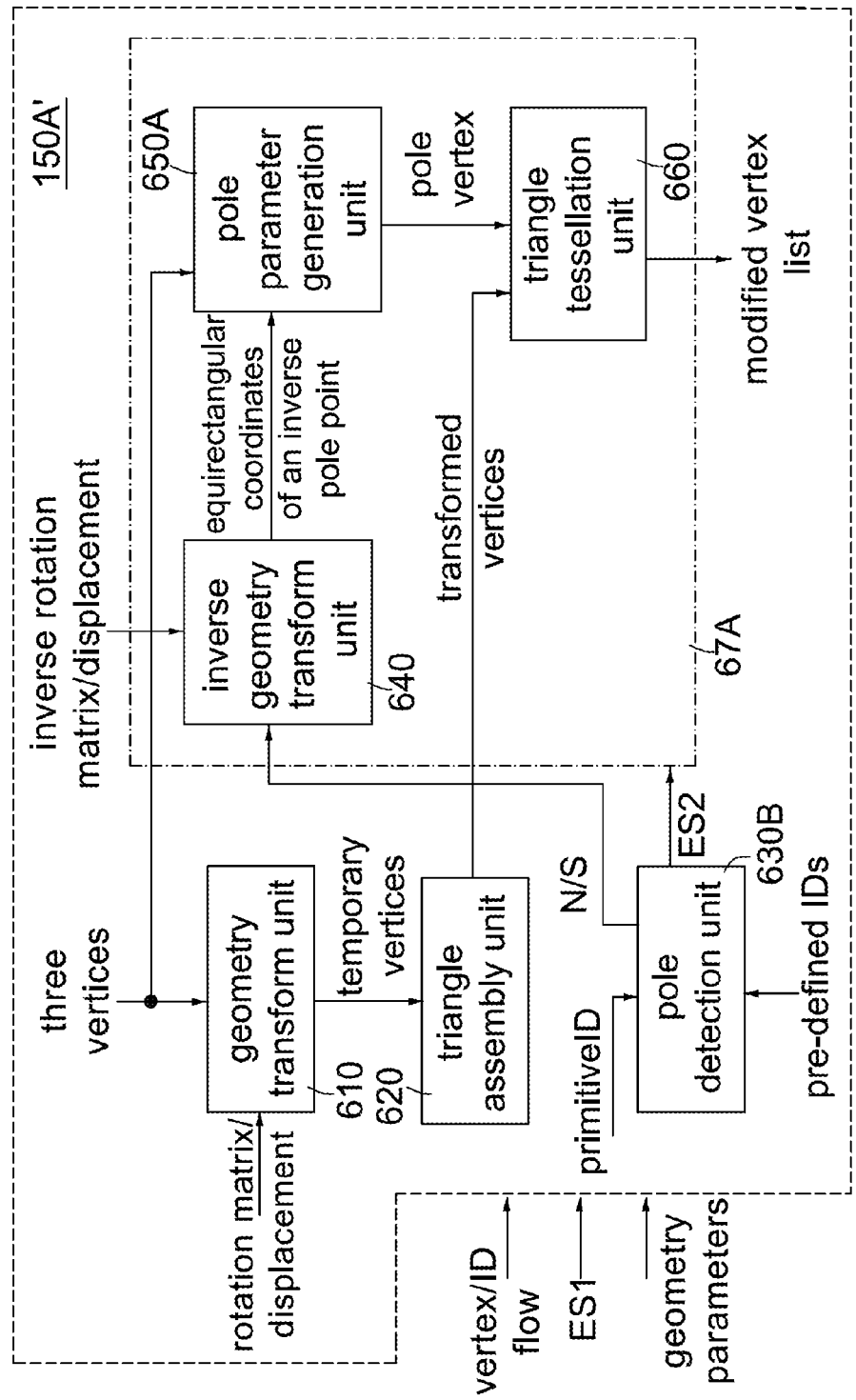
FIG. 6B is a block diagram of the geometry processing circuit according to another embodiment of the invention.

FIG. 6B is a block diagram of the geometry processing circuit according to another embodiment of the invention. The differences between FIGS. 6A and 6B are: (1) the operations of the pole detection units 630A and 630B are different; (2) the vertex/ID flow does not comprise any primitiveID in FIG. 6A while the vertex/ID flow comprises primitiveIDs (will be described below) in FIG. 6B; (3) the geometry parameters do not comprise primitiveID$_N$ and primitiveID$_S$ in FIG. 6A while the geometry parameters comprises primitiveID$_N$ and primitiveID$_S$ associated with two inverse pole points (will be described below) in FIG. 6B.

To cooperate with the geometry processing circuit 150A', the parameter setup unit 130 performs inverse geometry transform operations over the spherical/equirectangular coordinates of the north and south poles in advance to obtain equirectangular coordinates of two inverse pole points, which would be the north and south poles after geometry transform operations are finished. Besides, the parameter setup unit 130 additionally determines which polygons of the polygon mesh in FIG. 3C respectively contain the two inverse pole points according to their corresponding equirectangular coordinates. For example, referring to FIG. 3C, assuming that the quadrilaterals excluding the first row and the last row are divided into two triangles from top-left corner to bottom-right corner, where each polygon is designated as a unique primitiveID in a top-to-bottom and left-to-right manner. Accordingly, in the example of FIG. 3C, the primitiveIDs for the first row of polygons (i.e., quadrilaterals) are numbered from 0 to 9, the primitiveIDs for the second row of polygons (i.e., triangles) are numbered from 10 to 29, the primitiveIDs for the third row of polygons (i.e., triangles) are numbered from 30 to 49, and the primitiveIDs for the first row of polygons (i.e., quadrilaterals) are numbered from 50 to 59. Assuming that each quadrilateral is a square of 16 pixels by 16 pixels, the equirectangular panoramic image has a width (Wp) of 4096, and the top-most-leftmost point has equirectangular coordinates of (0, 0). For example, if one inverse pole point (to be the north pole) has equirectangular coordinates of (33, 47), then Y=(47/16)=2, X=(33/16)=2, pitch=(Wp/16)=256. Since the quadrilateral is divided into two triangles from top-left corner to bottom-right corner, it is clear that the bottom-left triangle of a quadrilateral contains the inverse pole point (33, 47) and thus its primitiveID$_N$=256+256*2+2*2=772, with the assumption that the bottom-left triangle is even and the top-right triangle is odd. In this manner, according to the quadrilateral size and the width (Wp) of the equirectangular panoramic image, the parameter setup unit 130 calculates which polygons (quadrilateral/triangle) with pre-defined IDs, for example, with primitiveID$_N$ and primitiveID$_S$, respectively contain the two inverse pole points. Please note that there is a possibility that one inverse pole point may fall on the edges of two adjacent polygons. For example, one inverse pole point associated with the north pole may fall on the edges of two adjacent polygons. In that case, two polygons with primitiveID$_{N1}$ and primitiveID$_{N2}$ contain the one inverse pole point. Thus, the number of polygons that contain the two inverse pole points ranges from two to four and thus the number of pre-defined IDs also ranges from two to four. Accordingly, the geometry parameters generated by the parameter setup unit 130 additionally include a plurality of pre-defined IDs, such as primitiveID$_{N-1}$, primitiveID$_{N-2}$, primitiveID$_{S-1}$ and primitiveID$_{S-2}$.

The pole detection unit 630B compares primitiveID of the three vertices with the pre-defined IDs from the geometry parameters to generate an enable signal ES2. If primitiveID does not match any one of the pre-defined IDs, the pole detection unit 630C de-asserts the enable signal ES2. Contrarily, if primitiveID matches any one of the pre-defined IDs, the pole detection unit 630B asserts the enable signal ES2 and sends an indication signal indicative of a north/south pole point to the inverse geometry transform unit 640. For example, if primitiveID matches primitiveID$_N$, the pole detection unit 630B asserts the enable signal ES2 and sends an indication signal indicative of a north pole point to the inverse geometry transform unit 640. Since the other components are the same in the geometry processing circuits 150A and 150A', their descriptions are omitted herein. The other components in FIG. 6B operate in the same way as those in FIG. 6A and thus their descriptions are omitted herein.

Figure 10A:
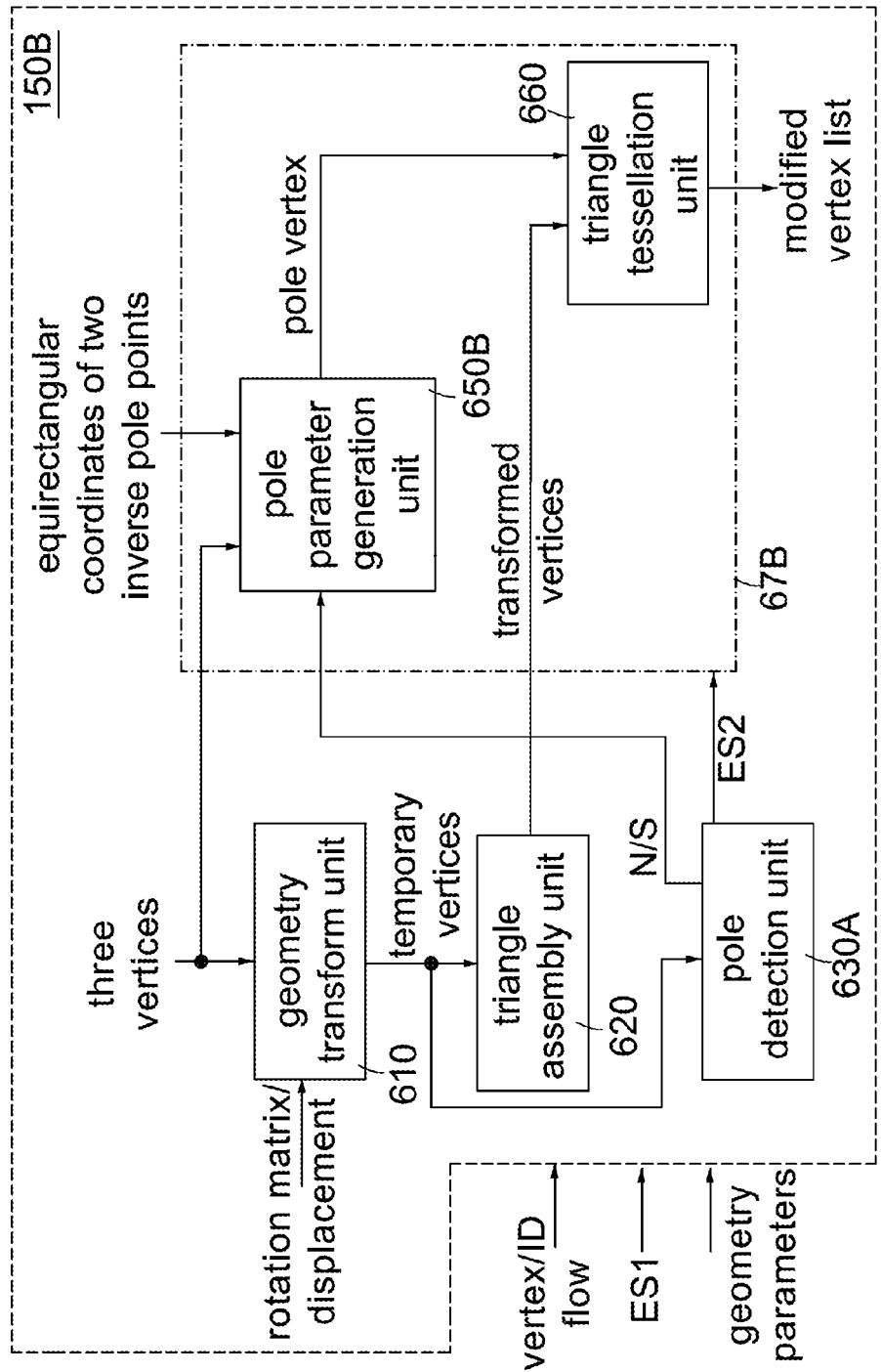
FIG. 10A is a block diagram of the geometry processing circuit according to another embodiment of the invention.

FIG. 10A is a block diagram of the geometry processing circuit according to another embodiment of the invention. The differences between the geometry processing circuits 150A/B in FIGS. 6A and 10A are: (1) the inverse geometry transform unit 640 is excluded in the pole processing module 67B, (2) the geometry parameters generated by the parameter setup unit 130 additionally include the equirectangular coordinates for two inverse pole points; and (3) the operations of the pole parameter generation unit 650B are slightly different from those of the pole parameter generation unit 650A. Due to the fact that the inverse geometry transform unit 640 is excluded in the pole processing module 67B, to cooperate with the geometry processing circuit 150B, the parameter setup unit 130 in advance performs inverse geometry transform operations over the spherical/equirectangular coordinates of the north and south poles to obtain equirectangular coordinates for two inverse pole points (which would be the north and south poles after geometry transform operations are performed) according to the inverse rotation matrix and the displacement, and thus the geometry parameters generated by the parameter setup unit 130 additionally include the equirectangular coordinates for the two inverse pole points. According to the indication signal (N/S) from the pole detection unit 630A, the pole parameter generation unit 650B selects one from the two inverse pole points as a desirous inverse pole point. Then, according to the equirectangular coordinates of the desirous inverse pole point and the three input vertices, the pole parameter generation unit 650B performs interpolation operations over the three input vertices with their data structures to generate related parameters for the desirous inverse pole point, such as the parameters (e.g., number of covering/overlapping camera images, ID of each camera image, texture coordinates in each camera image, blending weight for each camera image) listed in Table 1. With the related parameters being generated, the data structure of the desirous inverse pole point (corresponding to the north/south pole) is created, and thus the north/south pole is ready to become a pole vertex later (as shown in FIG. 9B). Afterward, the pole parameter generation unit 650B sends the pole vertex (corresponding to the desirous inverse pole point) with its data structure to the triangle tessellation unit 660. The other components in FIG. 10A operate in the same way as those in FIG. 6A and thus their descriptions are omitted herein.

Figure 10B:
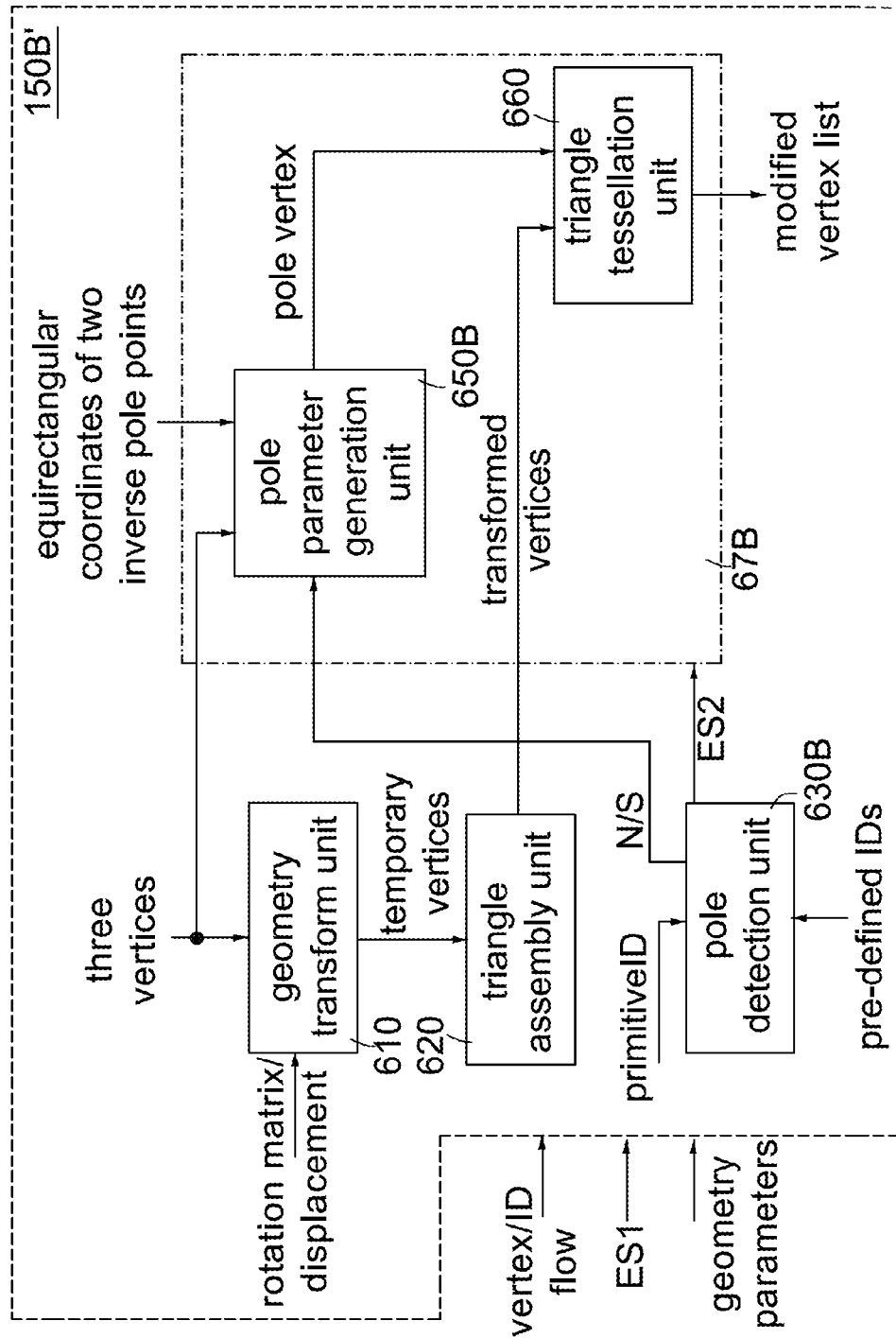
FIG. 10B is a block diagram of the geometry processing circuit according to another embodiment of the invention.

FIG. 10B is a block diagram of the geometry processing circuit according to another embodiment of the invention. The differences between the geometry processing circuits 150A'/B' in FIGS. 6B and 10B are: (1) the inverse geometry transform unit 640 is excluded in the pole processing module 67B, (2) the operations of the pole parameter generation unit 650B are slightly different from those of the pole parameter generation unit 650A as described above (in connection with FIG. 10A).

Figure 11:
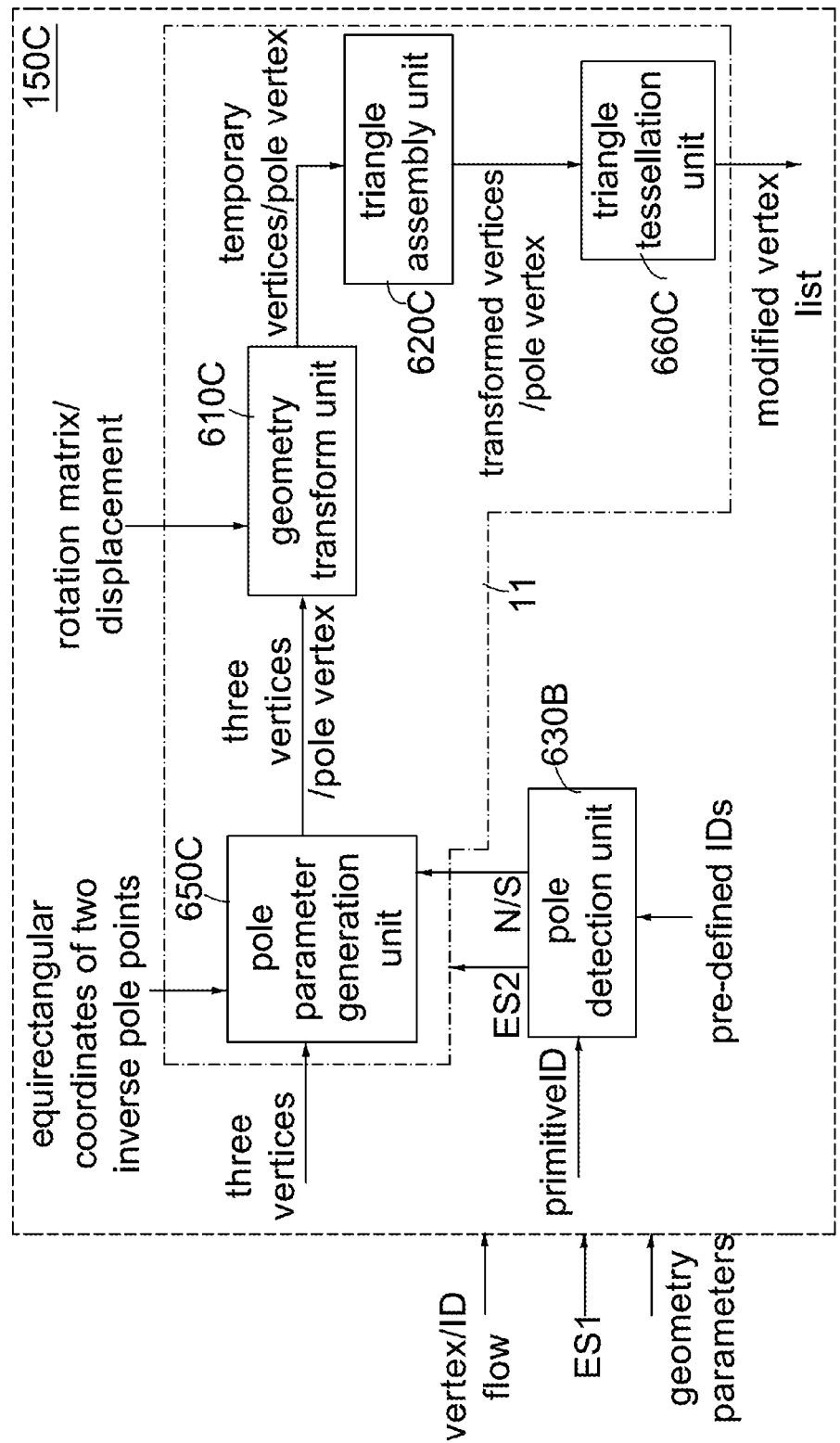
FIG. 11 is a block diagram of the geometry processing circuit according to another embodiment of the invention.

FIG. 11 is a block diagram of the geometry processing circuit according to another embodiment of the invention. Referring to FIG. 11, the geometry processing circuit 150C comprises a vertex processing module 11 and a pole detection unit 630B. The vertex processing module 11 comprises the geometry transform unit 610C, the triangle assembly unit 620C, the pole generation unit 650C and the triangle tessellation unit 660C. In this embodiment, the pole detection unit 630B in FIG. 11 and its cooperative parameter setup unit 130 operate in the same way as those described in FIG. 10B and thus their descriptions are omitted herein.

If the enable signal ES2 is de-asserted, the pole parameter generation unit 650C is disabled to bypass the three input vertices with their data structures; the geometry transform unit 610C, operating as the geometry transform unit 610, sequentially performs geometry transform operations over each of input three vertices with their data structures to generate temporary equirectangular coordinates of three temporary vertices; the triangle assembly unit 620C, operating as the triangle assembly unit 620, measures shortest distances along θ-axis among the three temporary vertices and their imaginary points to determine equirectangular coordinates of three transformed vertices; the triangle tessellation unit 660C is disabled to bypass the three transformed vertices with their data structures as a part of modified vertex list.

If the enable signal ES2 is asserted, the pole parameter generation unit 650C selects one from the two inverse pole points as a desirous inverse pole point according to the indication signal from the pole detection unit 630B. Then, according to the equirectangular coordinates of the desirous inverse pole point and the three input vertices, the pole parameter generation unit 650C performs interpolation operations over the three input vertices with their data structures to generate related parameters for the desirous inverse pole point, such as the parameters (e.g., number of covering/overlapping camera images, ID of each camera image, texture coordinates in each camera image, blending weight for each camera image) listed in Table 1. With the related parameters being generated, the data structure of the desirous inverse pole point is created, and thus the north/south pole is ready to become a pole vertex later (as shown in FIG. 9B). Afterward, the pole parameter generation unit 650C sends the three vertices and the pole vertex (corresponding to the desirous inverse pole point) with their data structures to the geometry transform unit 610C. After sequentially performing geometry transform operations over each of input three vertices with their data structures to generate temporary equirectangular coordinates of three temporary vertices, the geometry transform unit 610C outputs the three temporary vertices and the pole vertex with their data structures. After measuring shortest distances along θ-axis among the three temporary vertices and their imaginary points to determine equirectangular coordinates of three transformed vertices, the triangle assembly unit 620C outputs the three transformed vertices and the pole vertex with their data structures. Finally, the triangle tessellation unit 660C, operating as the triangle tessellation unit 660, divides a triangle including the three transformed vertices and the pole vertex into multiple regrouped triangles to output regrouped vertices for the regrouped triangles as a part of the modified vertex list.

In a second embodiment of the original vertex list, the original vertex list is divided into six surface vertex lists respectively corresponding to six camera images. Each surface vertex list is a list of a plurality of vertices covered by a corresponding camera image and each vertex is defined by its corresponding data structure. The data structure defines a vertex mapping between a destination space and a texture space (or between the equirectangular coordinates and the texture coordinates of one camera image). In one embodiment, the data structure includes, without limitation, equirectangular coordinates, a pole flag, texture coordinates in the corresponding camera image, ID for the corresponding camera image and a blending weight for the corresponding camera image. Table 2 shows an exemplary data structure for each vertex in each surface vertex list.

TABLE 2

| Attributes | Descriptions |
| --- | --- |
| (x, y) | Equirectangular coordinates |
| Pole flag | Indicate whether the vertex is a pole point(e.g., 1: pole point; 0: not pole point) |
| ID | ID of a corresponding camera image |
| (u, v) | Texture coordinates in the corresponding camera image |
| w | Default blending weight for the corresponding camera image |

In this embodiment, the six surface vertex lists are generated by the correspondence generator 140 and sequentially sent to the primitive assembly unit 135. Since there are six surface vertex lists, the primitive assembly unit 135 and the geometry processing circuit 150A/B/C/A'/B' sequentially perform their operations over the surface vertex lists six rounds.

Figure 12A:
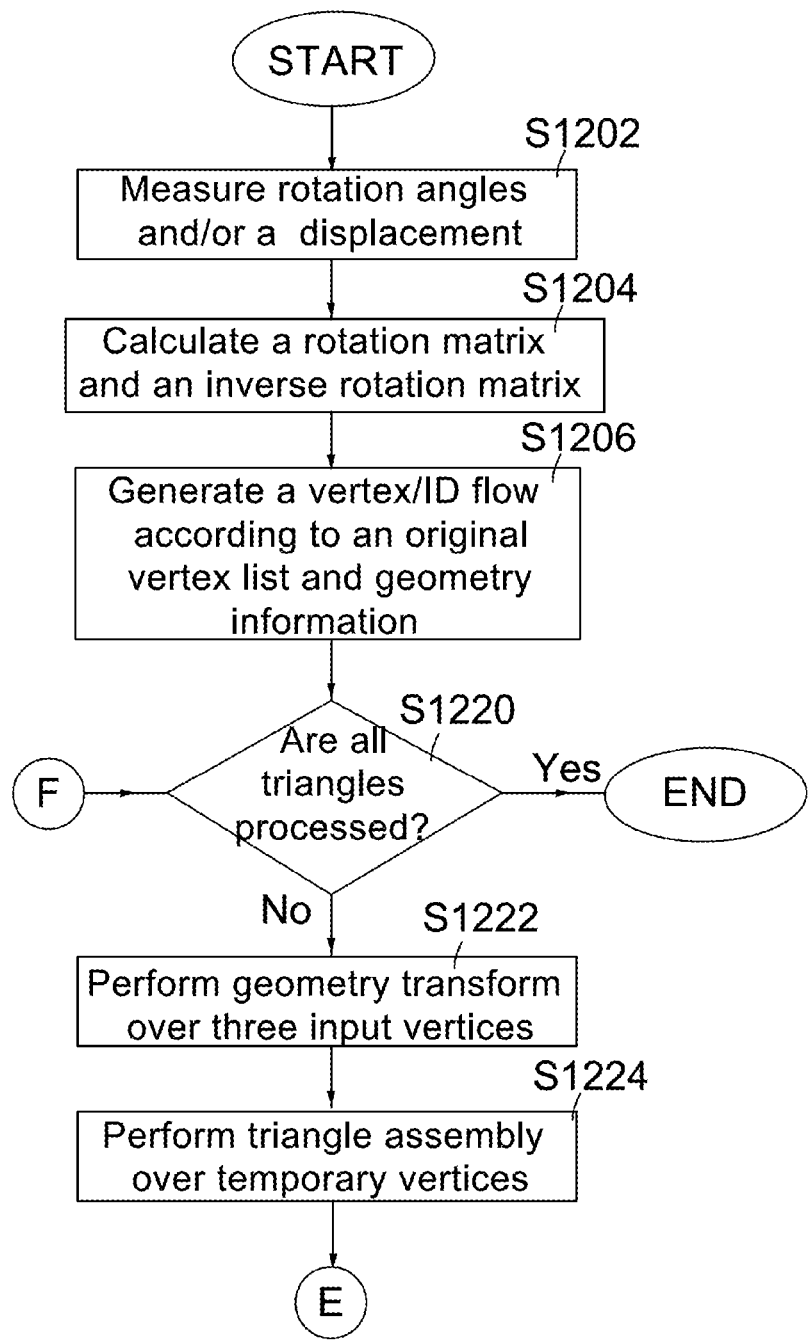
FIGS. 12A and 12B show a first flow chart of a transform method applied in an image processing system with a rotated/translated image capture module according to one embodiment of the invention.
Figure 12B:
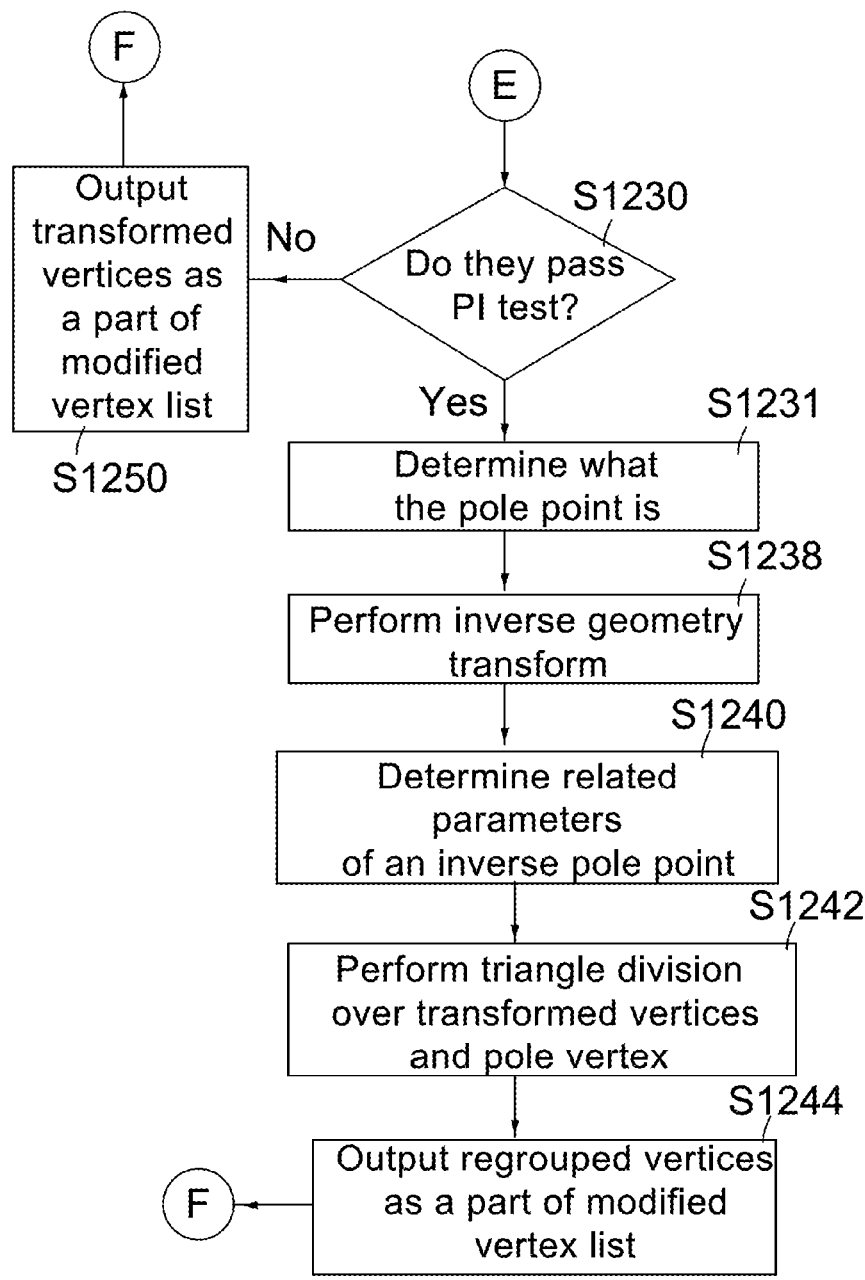

FIGS. 12A and 12B is a flow chart of a transform method applied in an image processing system with a rotated/translated image capture module according to one embodiment of the invention. Hereinafter, the transform method of the invention is described with reference to FIGS. 1, 3A-3C, 4A-4B, 6A, and 12A-12B.

Step S1202: Measure geometry information of the image capture module 160. For example, measure rotation angles α, β, γ of the image capture module 160 by a rotation detector 110 and measure the displacement $\overrightarrow{OO'}$ of the image capture module 160 by a displacement detector 120. The geometry information includes at least one of the rotation angles α, β, γ and the displacement $\overrightarrow{OO'}$.

Step S1204: Calculate a rotation matrix $R_{3D}$ and an inverse rotation matrix $R_{3D}$ by using equation (1) if the rotation angles α, β, γ are obtained to generate geometry parameters. The geometry parameters includes at least one of the rotation matrix $R_{3D}$, the inverse rotation matrix $R_{3D}^{-1}$ and the displacement $\overrightarrow{OO'}$.

Step S1206: Generate a vertex/ID flow according to an original vertex list and the geometry information. The original vertex list comprises a plurality of mesh packets, each comprising a header and a payload. The header consists of a type flag (indicating fan-type or strip-type) and a number Nv. The number Nv specifies there are Nv vertices (i.e., Nv data structures) contained in the payload or triangle mesh. If the type flag is fan-type and the enable signal ES1 is de-asserted (i.e., rotation angles and the displacement equal to zero), four vertices forming a quadrilateral are outputted together with its primitiveID as a part of the vertex/ID flow, otherwise three vertices forming a triangle are outputted together with its primitiveID as a part of the vertex/ID flow.

Step S1220: Determine whether all triangles from the vertex/ID flow are processed. If YES, the flow is terminated; otherwise, the flow goes to step S1222.

Step S1222: Perform geometry transform operations over each of three input vertices (of a current triangle) with their data structures from the vertex/ID flow to generate the equirectanglar coordinates of three temporary vertices according to the geometry parameters. For example, perform geometry transform operations over each of three original vertices (A, B, C in FIG. 7) to generate the equirectanglar coordinates of three temporary vertices (A', B', C' in FIG. 7) according to at least one of the rotation matrix $R_{3D}$ and the displacement $\overrightarrow{OO'}$.

Step S1224: Perform triangle assembly operations over the three temporary vertices to determine the equirectanglar coordinates (or data structures) of the transformed vertices of the geometry-transformed triangle. Based on the θ-axis periodic feature, perform triangle assembly operations to measure/find the shortest distances along θ-axis among the temporary vertices (A', B', C') and their imaginary points (A'', B'', C'') and to determine the equirectanglar coordinates (or data structures) of the transformed vertices of the geometry-transformed triangle.

Step S1230: Determine whether the temporary vertices pass the pole inside (PI) test. If YES (i.e., PI_flag=1), it indicates a pole point is found and the flow goes to step S1232; otherwise, it indicates no pole point is found and the flow goes to step S1250.

Step S1231: Determine what the pole point is. In one embodiment, determine which pole point (N/S) is surrounded by the three temporary vertices according to equirectangular coordinates of the temporary vertices to generate an indication signal indicative of a north/south pole point. In an alternative embodiment, generate an indication signal indicative of a north/south pole point according to which pre-defined ID (e.g., $primitiveID_N$ or $primitiveID_S$) matches primitiveID of the current triangle.

Step S1238: Perform inverse geometry transform operations over the spherical/equirectangular coordinates of the north/south pole to obtain equirectangular coordinates of a desirous inverse pole point according to the indication signal.

Step S1240: Determine related parameters for an inverse pole point. In one embodiment, according to equirectangular coordinates of the desirous inverse pole point and the three input vertices, perform interpolation operations over the three input vertices to generate related parameters for the desirous inverse pole point (to be the north/south pole), such as the parameters (e.g., number of covering/overlapping camera images, ID of each camera image, texture coordinates in each camera image, blending weight for each camera image) listed in Table 1. With the related parameters being generated, the data structure of the inverse pole point is created, and thus the north/south pole is ready to become a pole vertex p later (as shown in FIG. 9B).

Step S1242: Perform triangle division operations to divide a triangle including the three transformed vertices and the pole vertex into multiple regrouped triangles. For example, as shown in FIGS. 9A-9B, the triangle a'b'c' is divided into two triangles a'b' p and a'c'p for case 1, and the triangle a'b'c' is divided into three triangles a'b' p, a'c'p and b'c'p for case 2.

Step S1244: Output regrouped vertices with their data structures for regrouped triangles as a part of a modified vertex list. As the example of FIG. 9B, regrouped vertices a'b' p and a'c'p with their data structures are outputted as a part of a modified vertex list for case 1, and regrouped vertices a'b' p, a'c'p and b'c'p with their data structures are outputted as a part of a modified vertex list for case 2.

Step S1250: Output the three transformed vertices with their data structures as a part of a modified vertex list.

Figure 12C:
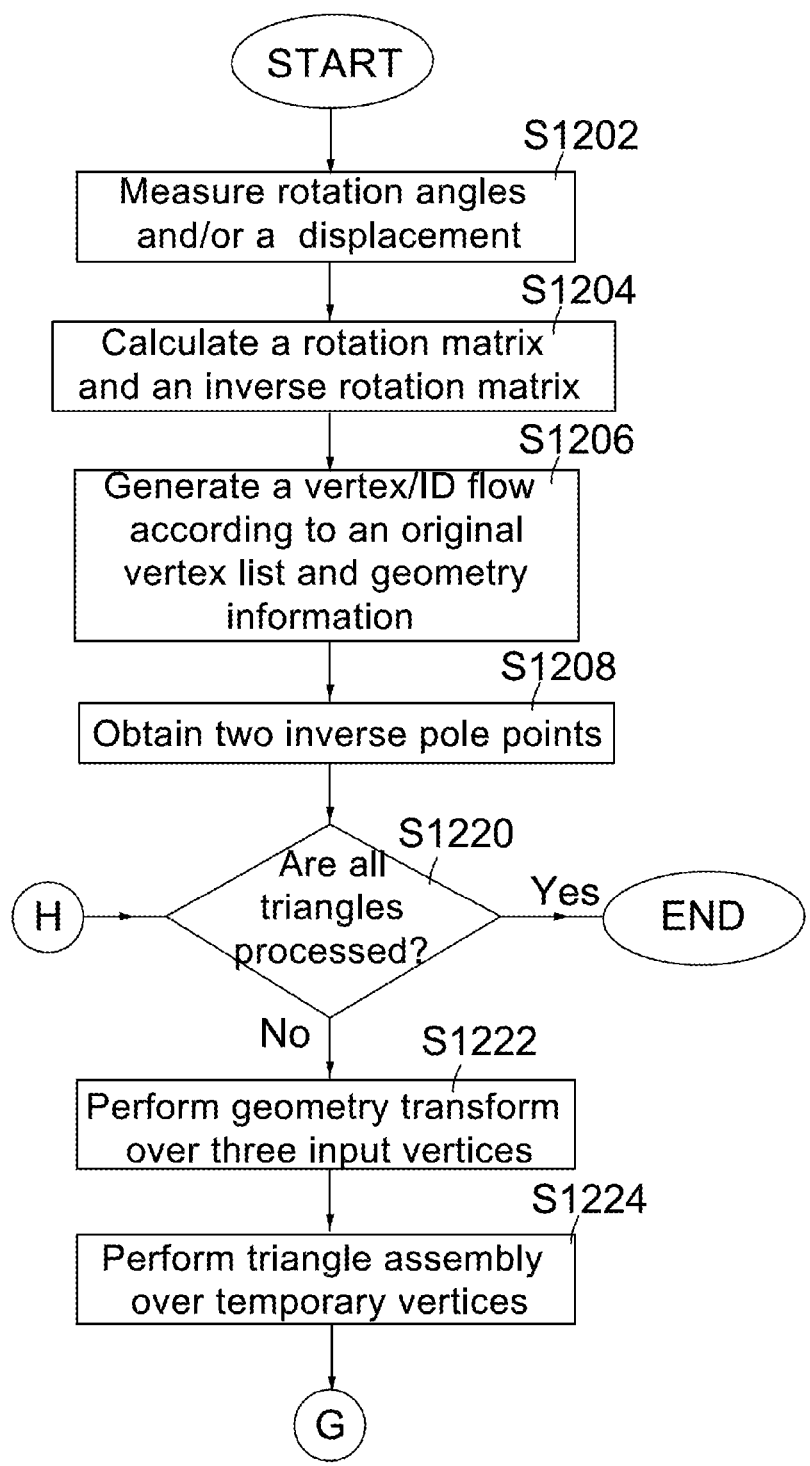
FIGS. 12C and 12D show a second flow chart of a transform method applied in an image processing system with a rotated/translated image capture module according to another embodiment of the invention.
Figure 12D:
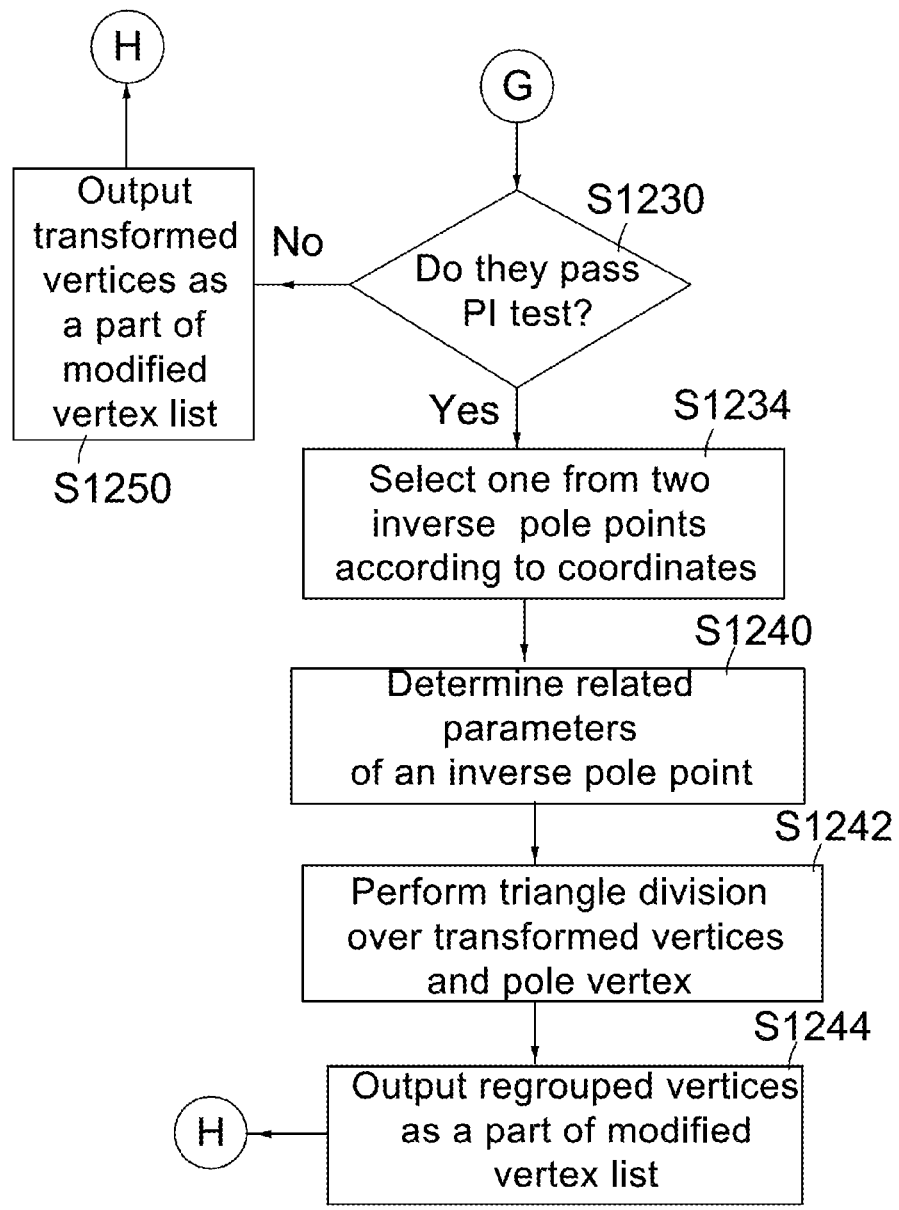

FIGS. 12C-12D is a flow chart of a transform method applied in an image processing system with a rotated/translated image capture module according to another embodiment of the invention. Hereinafter, the transform method of the invention is described with reference to FIGS. 1, 3A-3C, 4A-4B, 10A and 12C-12D. In comparison with FIGS. 12A and 12B, only steps S1208 and 1234 are new in FIGS. 12C and 12D, and thus the descriptions for the same steps are omitted herein.

Step S1208: Perform inverse geometry transform operations over the spherical/equirectangular coordinates of the north and south pole points to obtain the equirectangular coordinates of two inverse pole points according to the geometry parameters.

Step S1234: Select one from the two inverse pole points as a desirous inverse pole point according to equirectangular coordinates of the temporary vertices. In an embodiment, first, determine which pole (N/S) is surrounded by the temporary vertices according to equirectangular coordinates of the transformed vertices to generate an indication signal (N/S); then, according to the indication signal, select one from the two inverse pole points as the desirous inverse pole point.

Figure 12E:
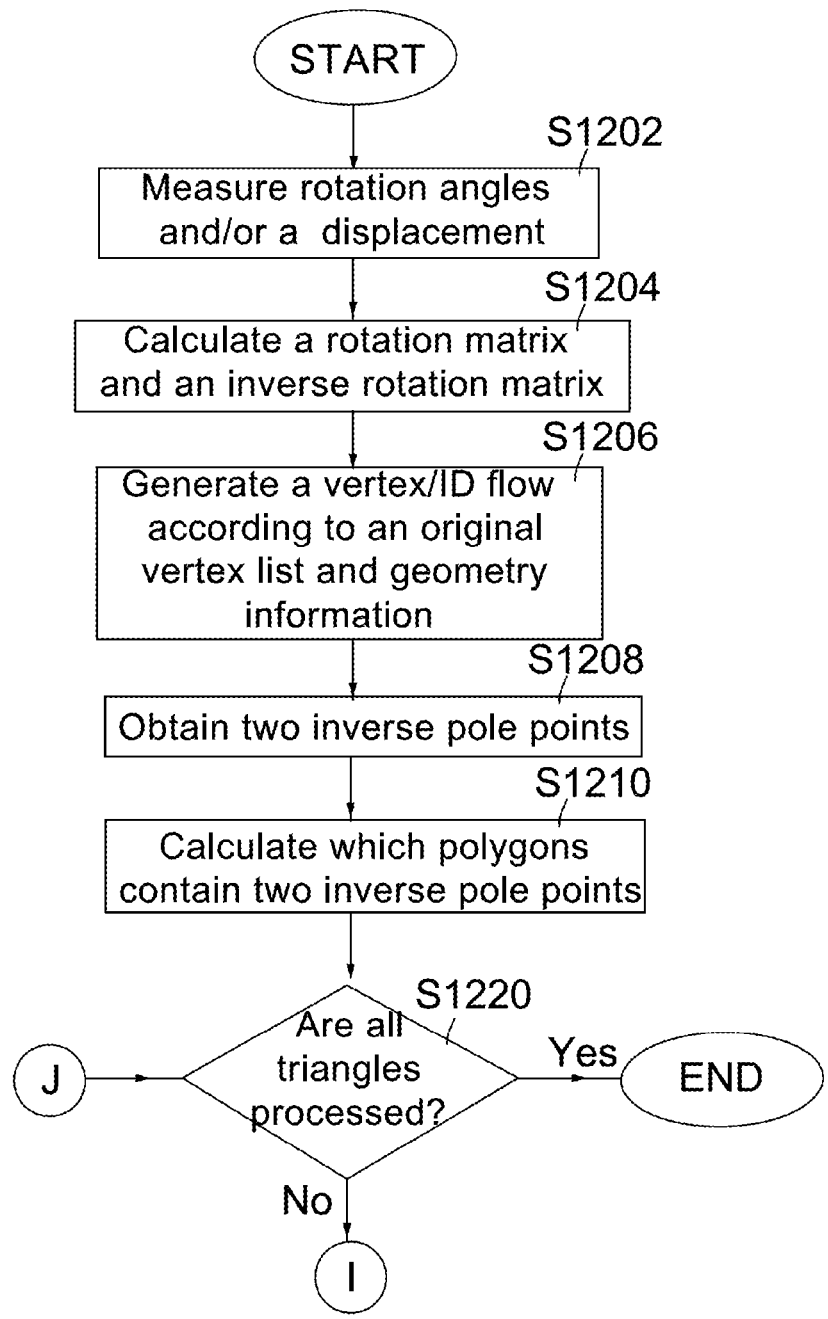
FIG. 12E is a partial flow chart of a transform method applied in an image processing system with a rotated/translated image capture module.
Figure 12F:
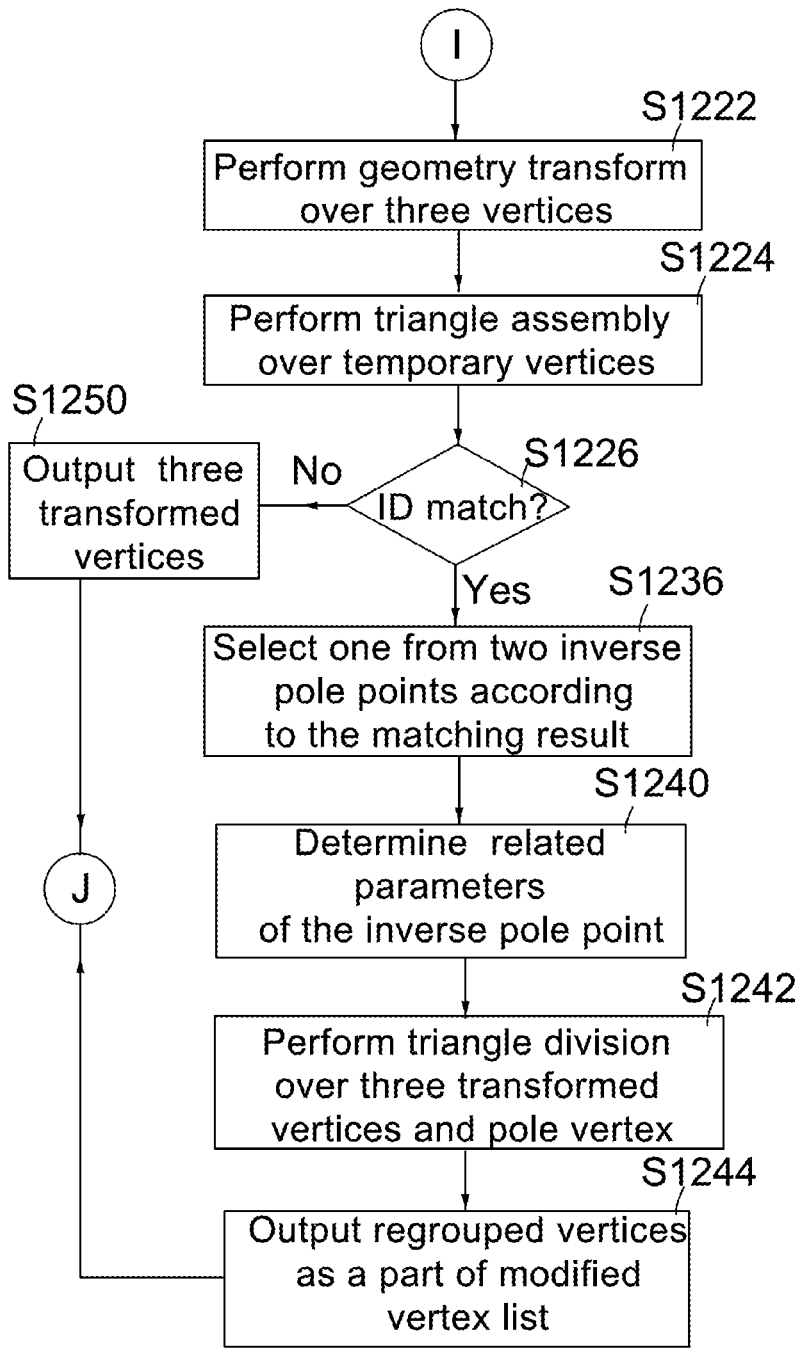
FIG. 12F is a remaining flow chart of the transform method applied in an image processing system with a rotated/translated image capture module, which forms a third flow chart of the transform method in conjunction with the partial flow chart shown in FIG. 12E according to another embodiment of the invention.

FIGS. 12E-12F is a flow chart of a transform method applied in an image processing system with a rotated/translated image capture module according to another embodiment of the invention. Hereinafter, the transform method of the invention is described with reference to FIGS. 1, 3A, 4A-4B, 10B and 12E-12F. In comparison with FIGS. 12A-12D, only steps S1210, S1226 and 1236 are new in FIGS. 12E-12F, and thus the descriptions for the same steps are omitted herein.

Step S1210: Calculate which polygons (quadrilateral/triangle) with pe-defined IDs, for example, with primitiveID$_N$ and primitiveID$_S$, respectively contain two inverse pole points according to the quadrilateral size and the width (Wp) of the equirectangular panoramic image as the example of the polygon mesh in FIG. 3C.

Step S1226: Determine whether primitiveID of the current triangle matches one of the pe-defined IDs. If YES, the flow goes to step S1236; otherwise, the flow goes to step S1250.

Step S1236: Select one from the two inverse pole points as a desirous inverse pole point according to the matching result of step S1226. In an embodiment, determine which pre-defined ID (e.g., primitiveID$_N$ or primitiveID$_S$) matches primitiveID of the current triangle to generate an indication signal (N/S) in step S1226; then, according to the indication signal, select one from the two inverse pole points as the desirous inverse pole point.

Step S1240: Determine related parameters for a desirous inverse pole point. Then, according to the equirectangular coordinates of the desirous inverse pole point and the three input vertices, perform interpolation operations over the three input vertices with their data structures to determine related parameters for the desirous inverse pole point.

Figure 12G:
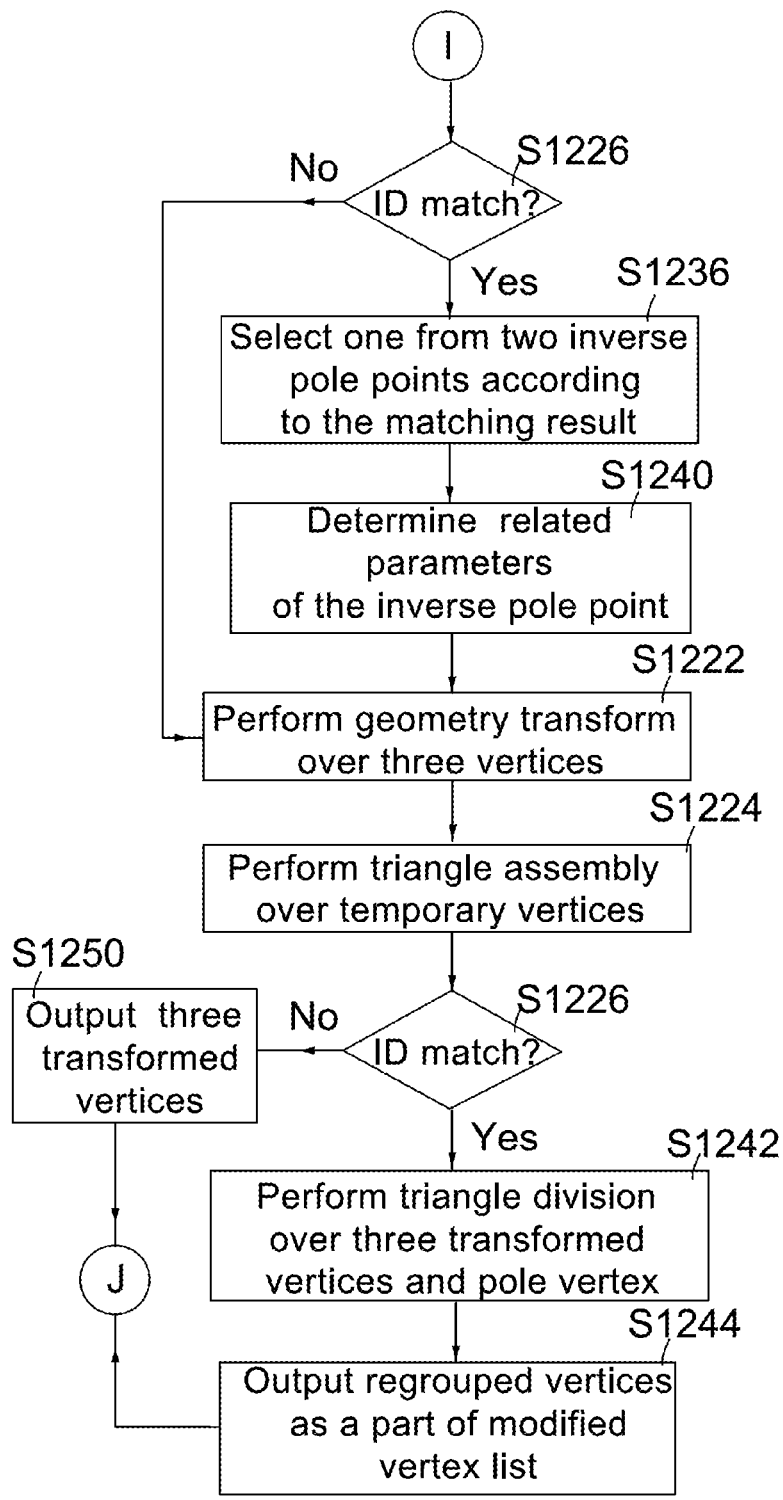
FIG. 12G is a remaining flow chart of a transform method applied in an image processing system with a rotated/translated image capture module, which forms a fourth flow chart of the transform method in conjunction with the partial flow chart shown in FIG. 12E according to another embodiment of the invention.

FIGS. 12E and 12G show a flow chart of a transform method applied in an image processing system with a rotated/translated image capture module according to another embodiment of the invention. In FIGS. 12A-12H, the same steps with the same function are designated with the same reference numerals. All the steps of FIGS. 12E and 12G are described above and thus the descriptions for the same steps are omitted herein. However, please note that the sequence of the steps in FIG. 12G is entirely different from that in FIG. 12F.

Figure 12H:
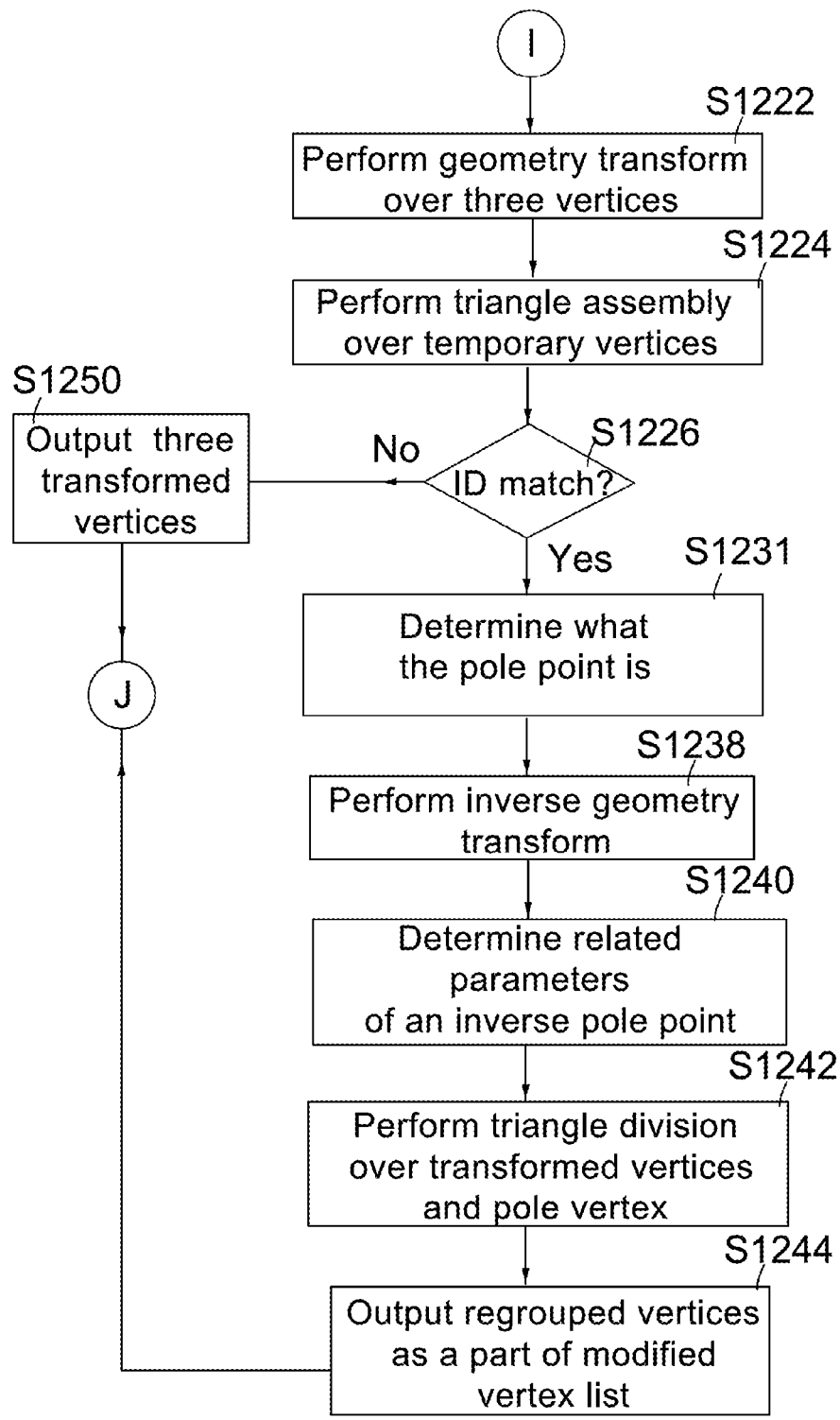
FIG. 12H is a remaining flow chart of a transform method applied in an image processing system with a rotated/translated image capture module, which forms a fifth flow chart of a transform method in conjunction with the partial flow chart shown in FIG. 12E according to another embodiment of the invention.

FIGS. 12E and 12H show a flow chart of a transform method applied in an image processing system with a rotated/translated image capture module according to another embodiment of the invention. All the steps of FIGS. 12E and 12H are described above and thus the descriptions for the same steps are omitted herein. However, please note that the sequence of the steps in FIG. 12H is different from those in FIGS. 12F and 12G.

In one embodiment, the transform apparatus 100 that excludes the rotation detector 110 and the displacement detector 120 is implemented with a general-purpose processor having a first program memory (not shown); the image processing apparatus 170 is implemented with a second program memory and a graphics processing unit (GPU) (not shown); the video encoder 180 is implemented with a conventional H.264 video encoder. The first program memory stores a first processor-executable program and the second program memory stores a second processor-executable program. When the first processor-executable program is executed by the general-purpose processor, the general-purpose processor is configured to function as: the primitive assembly unit 135, the parameter setup unit 130, the geometry transform unit 610/610C, the triangle assembly unit 620/620C, the pole detection unit 630A/B, the inverse geometry transform unit 640, the pole parameter generation unit 650A/B/C, and the triangle tessellation unit 660/660C. When the second processor-executable program is executed by the GPU, the GPU is configured to function as: the image processing apparatus 170 that performs rasterization, texture mapping and blending operations to form a panoramic image according to a modified vertex list.

Figure 13:
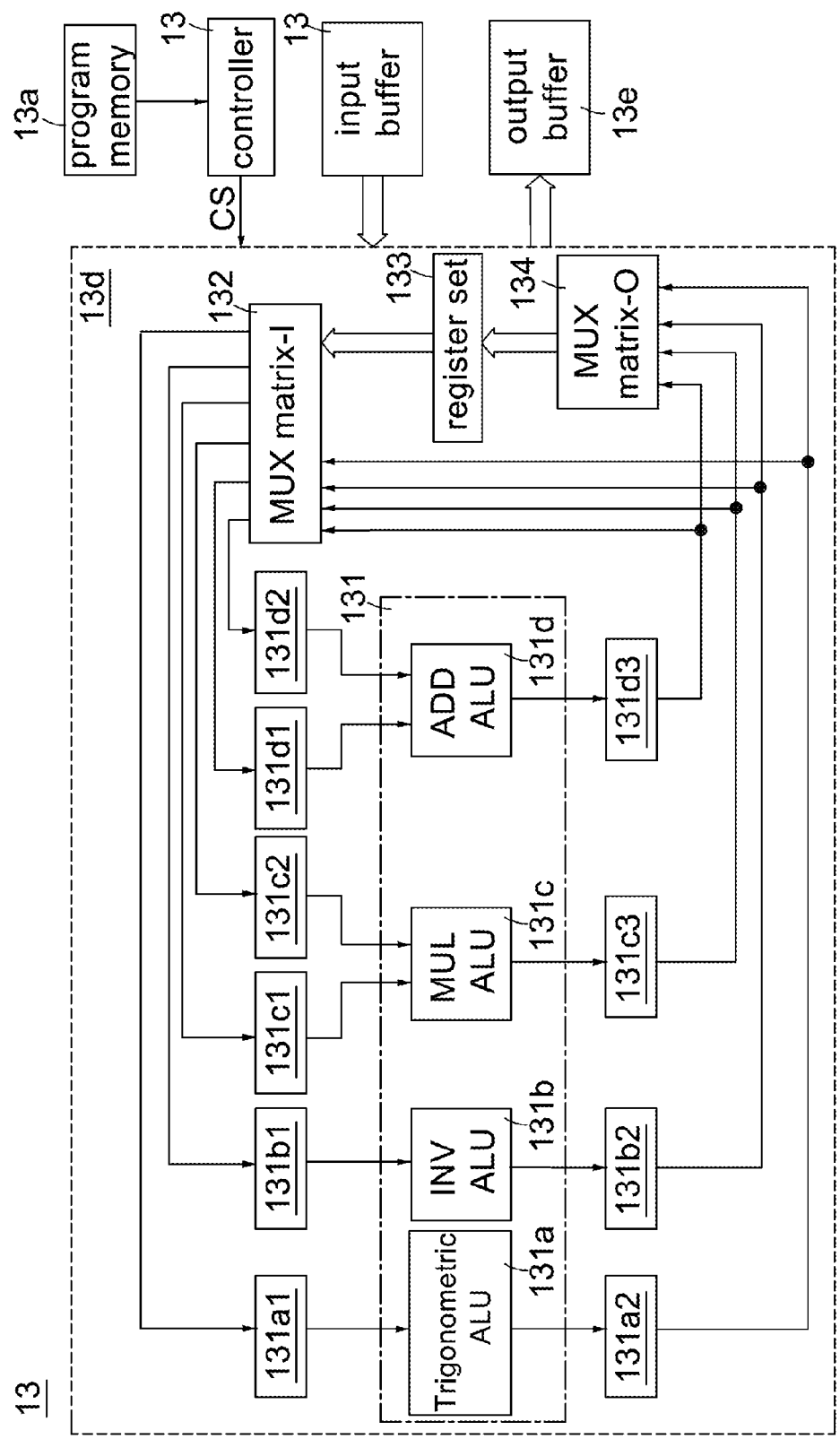
FIG. 13 shows a schematic diagram of the geometry processor.

In a preferred embodiment, the transform apparatus 100 that excludes the rotation detector 110 and the displacement detector 120 is not implemented with a general-purpose processor having a first program memory, but with a geometry processor 13 instead. Referring to FIG. 13, the geometry processor 13 is a simplified very long instruction word (VLIW) processor, which is well known in the art. FIG. 13 shows a schematic diagram of the geometry processor. The geometry processor 13 includes a program memory 13a, a controller 13b, an input buffer 13c, an output buffer 13e and a data processing unit 13d. The data processing unit 13d includes an arithmetic logic unit (ALU) set 131, a MUX matrix-I 132, a register set 133, a MUX matrix-O 134, a plurality of input registers 131a1, 131b1, 131c1-131c2, 131d1-131d2, and a plurality of output registers 131a2, 131b2, 131c3, 131d3. The register set 133 includes a plurality of temporary registers. The program memory 13a stores a first processor-executable program. The ALU set 131 includes a multiplier ALU 131c, an adder ALU 131d, an inverse ALU 131b and a Trigonometric ALU (comprising SIN/COS/ARCTAN operations) 131a. In an embodiment, the inverse ALU 131b and the trigonometric ALU 131a is implemented by using lookup-table and performing interpolation operations as well known in the art. Each of the input registers 131a1, 131b1, 131c1-131c2, 131d1-131d2 may come from any one of the temporary registers while each of the output registers 131a2, 131b2, 131c3, 131d32 can be written into the register set 133 or the input registers 131a1, 131b1, 131c1-131c2, 131d1-131d2 by the MUX matrix-I 132 or the MUX matrix-O 134. The controller 13b receives the first processor-executable program from the program memory 13a, executes the program and generates a plurality of control signals CS to control the data processing unit 13d. The control signals CS may control MUX section for MUX matrix-I 132 and the MUX matrix-O 134, enable at least one of the temporary registers, or enable at least one of the Trigonometric ALU 131a, the multiplier ALU 131c, the adder ALU 131d and the inverse ALU 131b. When the program is executed by the controller 13b, the controller 13b is configured to function as: the geometry transform unit 610/610C, the triangle assembly unit 620/620C, the pole detection unit 630A/B, the inverse geometry transform unit 640, the pole parameter generation unit 650A/B/C, and the triangle tessellation unit 660/660C.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A transform apparatus applied in an image processing system having an image capture module and an image processing apparatus, the image capture module capturing a 360-degree horizontal field of view and 180-degree vertical field of view to generate a plurality of camera images, the apparatus comprising:
   a geometry information detector for measuring geometry information of the image capture module to determine whether the image capture module is moved;
   a parameter setup unit coupled to the geometry information detector for calculating geometry parameters according to the geometry information;
   a primitive assembly unit for receiving an original vertex list to generate a vertex/ID flow; and
   a geometry processing circuit for performing geometry transform operations over the vertex/ID flow according to the geometry parameters to generate a modified vertex list if the image capture module is moved;
   wherein the geometry processing circuit comprises:
   a geometry transform unit for sequentially performing the geometry transform operations over a current group of three first vertices with their data structures from the vertex/ID flow according to the geometry parameters to correct equirectangular coordinates of the three first vertices as three temporary vertices if the image capture module is moved; and
   a triangle assembly unit for measuring shortest distances along $\theta$ axis among the three temporary vertices and their imaginary points to determine a transformed triangle with three second vertices as a part of the modified vertex list, wherein a difference between each temporary vertex and its corresponding imaginary point is $2\pi$ radians along $\theta$ axis;
   wherein the geometry information comprises at least one of a displacement and rotation angles associated with the movement of the image capture module;
   wherein the vertex/ID flow comprises a plurality of groups of three first vertices with their data structures, and each group of three first vertices form a corresponding triangle in a polygon mesh modeling a panoramic image from the image processing apparatus;
   wherein the modified vertex list comprises a plurality of groups of second vertices with their data structures, and each group of three second vertices form a corresponding triangle in the polygon mesh;
   wherein the original vertex list comprises a plurality of third vertices with their data structures, and the original vertex list is obtained by conducting calibration between the plurality of camera images and the panoramic image for the plurality of third vertices;
   wherein each of the data structures defines a corresponding vertex mapping between the plurality of camera images and the panoramic image; and
   wherein the modified vertex list is inputted to the image processing apparatus and causes the image processing apparatus to generate a modified panoramic image.

2. The apparatus according to claim 1, wherein the geometry information detector comprises:
   a rotation detector for measuring the rotation angles of the image capture module;
   wherein the geometry parameters comprise a rotation matrix and an inverse rotation matrix.

3. The apparatus according to claim 1, wherein the geometry information detector comprises:
   a displacement detector for measuring the displacement of the image capture module;
   wherein the geometry parameters comprise the displacement.

4. The apparatus according to claim 1, wherein the geometry processing circuit further comprises:
   a pole detection unit for detecting whether the three temporary vertices surround a pole point to generate an indication signal.

5. The apparatus according to claim 4, wherein the pole detection unit detects whether the three temporary vertices surround the pole point according to relative distances of the three temporary vertices along $\theta$ axis.

6. The apparatus according to claim 4, wherein the vertex/ID flow further comprises IDs for the groups of three first vertices, wherein the pole detection unit detects whether the three temporary vertices surround the pole point by comparing a plurality of pre-defined IDs with an ID associated with the current group of three first vertices.

7. The apparatus according to claim 6, wherein the parameter setup unit further performs inverse geometry transform operations over a north pole and a south pole according to the geometry parameters to generate equirectangular coordinates of two inverse pole points, and calculates which polygons with the pre-defined IDs in the polygon mesh respectively contain the two inverse pole points according to a polygon size and a width of the panoramic image to output the geometry parameters further comprising the equirectangular coordinates of the two inverse pole points and the pre-defined IDs.

8. The apparatus according to claim 4, wherein the geometry processing circuit further comprises:
a pole parameter generation unit for performing interpolation operations over the three input vertices according to equirectangular coordinates of a desirous inverse pole point to generate a data structure of the pole point if the pole point is detected, wherein the desirous inverse pole point is a point that becomes the pole point surrounded by the three temporary vertices after the geometry transform operations are performed; and
a triangle tessellation unit for dividing the transformed triangle including the three second vertices and the pole point into multiple regrouped triangles to output regrouped vertices with their data structures for the regrouped triangles as a part of the modified vertex list if the pole point is detected;
wherein the three second vertices with their data structures are directly outputted as a part of the modified vertex list if no pole point is detected.

9. The apparatus according to claim 8, wherein the parameter setup unit further performs inverse geometry transform operations over a the north pole and a south pole according to the geometry parameters to generate equirectangular coordinates of two inverse pole points, wherein the pole parameter generation unit further selects one from the two inverse pole points as the desirous inverse pole point according to the indication signal.

10. The apparatus according to claim 9, wherein the pole parameter generation unit is coupled between the pole detection unit and the triangle tessellation unit.

11. The apparatus according to claim 9, wherein the geometry transform unit and the triangle assembly unit are coupled between the pole parameter generation unit and triangle tessellation unit.

12. The apparatus according to claim 8, wherein the geometry processing circuit further comprises:
an inverse geometry transform unit coupled between the pole detection unit and the pole parameter generation unit for performing inverse geometry transform operations over one of a north pole and a south pole to generate the equirectangular coordinates of the desirous inverse pole point according to the indication signal if the pole point is detected.

13. The apparatus according to claim 1, wherein the original vertex list is divided into a plurality of original surface vertex lists and the modified vertex list is divided into a plurality of modified surface vertex lists, and numbers of original surface vertex lists and modified surface vertex lists are equal to a number of camera images.

14. A transform method applied in an image processing system having an image capture module and an image processing apparatus, the image capture module capturing a 360-degree horizontal field of view and 180-degree vertical field of view to generate a plurality of camera images, the method comprising:

when the image capture module is moved, performing transform operations over a vertex/ID flow until all first vertices from the vertex/ID flow are processed to generate a modified vertex list, wherein the modified vertex list is inputted to the image processing apparatus and causes the image processing apparatus to generate a modified panoramic image;
wherein the step of performing the transform operations comprises:
first, sequentially performing geometry transform operations over a current group of three first vertices with their data structures from the vertex/ID flow according to geometry parameters to correct equirectangular coordinates of the three first vertices as three temporary vertices; and
then, measuring shortest distances along θ axis among the three temporary vertices and their imaginary points to determine a transformed triangle with three second vertices as a part of the modified vertex list, wherein a difference between each temporary vertex and its corresponding imaginary point is $2\pi$ radians along θ axis; and
repeating the steps of sequentially performing the geometry transform operations and measuring until all the first vertices from the vertex/ID flow are processed;
wherein the geometry parameters comprise at least one of a rotation matrix, an inverse rotation matrix and a displacement associated with the movement of the image capture module; and
wherein the vertex/ID flow comprises a plurality of groups of three first vertices with their data structures, and each group of three first vertices form a corresponding triangle in a polygon mesh modeling a panoramic image from the image processing apparatus;
wherein the modified vertex list comprises a plurality of groups of second vertices with their data structures, and each group of three second vertices form a corresponding triangle in the polygon mesh; and
wherein each of the data structures defines a corresponding vertex mapping between the plurality of camera images and the panoramic image.

15. The method according to claim 14, further comprising:
first, measuring geometry information of the image capture module prior to the step of performing the transform operations;
then, calculating the geometry parameters according to the geometry information; and
then, generating the vertex/ID flow according to an original vertex list from a calibration system and the geometry parameters;
wherein the original vertex list comprises a plurality of second third vertices with their data structures and the original vertex list is obtained by conducting calibration between the plurality of camera images and the panoramic image for the plurality of third vertices.

16. The method according to claim 15, wherein the step of measuring the geometry information comprises:
measuring rotation angles of the image capture module to determine whether the image capture module is moved;
wherein the geometry parameters comprise the rotation matrix and the inverse rotation matrix.

17. The method according to claim 15, wherein the step of measuring the geometry information comprises:
measuring a displacement of the image capture module to determine whether the image capture module is moved; wherein the geometry parameters comprise the displacement.

18. The method according to claim 15, wherein the original vertex list is divided into a plurality of original surface vertex lists and the modified vertex list is divided into a plurality of modified surface vertex lists, and numbers of original surface vertex lists and modified surface vertex lists are equal to a number of camera images.

19. The method according to claim 14, wherein the step of performing the transform operations further comprises:
detecting whether the three temporary vertices surround a pole point to generate a detecting result; and
outputting the three second vertices with their data structures of the transformed triangle as a part of the modified vertex list if no pole point is detected.

20. The method according to claim 19, wherein the step of detecting comprises:
detecting whether the three temporary vertices surround the pole point according to relative distances of the three temporary vertices along θ axis.

21. The method according to claim 19, wherein the step of detecting comprises:
comparing a plurality of pre-defined IDs with an ID associated with the current group of three first vertices from the vertex/ID list to detect whether the three temporary vertices surround the pole point.

22. The method according to claim 21, wherein the step of calculating further comprises:
performing inverse geometry transform operations over a north pole and a south pole according to the geometry parameters to generate equirectangular coordinates of two inverse pole points; and
calculating which polygons with the pre-defined IDs in the polygon mesh respectively contain the two inverse pole points according to a polygon size and a width of the panoramic image.

23. The method according to claim 19, wherein the step of performing the transform operations further comprises:
if the pole point is detected, determining equirectangular coordinates of a desirous inverse pole point, wherein the desirous inverse pole point is a point that becomes the pole point surrounded by the three temporary vertices after the geometry transform operations are performed;
then, performing interpolation operations over the three first vertices according to equirectangular coordinates of the desirous inverse pole point to generate a data structure of the pole point;
then, performing triangle division operations to divide the transformed triangle including the three second vertices and the pole point into multiple regrouped triangles to output regrouped vertices with their data structures for the regrouped triangles as a part of the modified vertex list; and
repeating the steps of performing the geometry transform operations, measuring shortest distances, detecting, outputting, determining the equirectangular coordinates, performing the interpolation operations and performing the triangle division operations until all of the first vertices from the vertex/ID flow are processed.

24. The method according to claim 23, wherein the step of determining the equirectangular coordinates further comprises:
performing inverse geometry transform operations over the pole point according to the geometry parameters to generate the equirectangular coordinates of the desirous inverse pole point.

25. The method according to claim 23, wherein the step of calculating the geometry parameters further comprises:
performing inverse geometry transform operations over a north pole and a south pole according to the geometry parameters to generate equirectangular coordinates of two inverse pole points;
wherein the geometry parameters further comprises the equirectangular coordinates of the two inverse pole points.

26. The method according to claim 25, wherein the step of determining the coordinates comprises:
selecting one from the two inverse pole points as the desirous pole point according to the detecting result.

27. An image processing system for receiving an original vertex list from a calibration system and generating a panoramic image, comprising:
an image capture module for capturing a 360-degree horizontal field of view and 180-degree vertical field of view to generate a plurality of camera images;
a transform apparatus for generating a modified vertex list according to the original vertex list if the image capture module is moved; and
an image processing apparatus for performing rasterization, texture mapping and blending operations to form a modified panoramic image according to the modified vertex list if the image capture module is moved;
wherein the transform apparatus comprises:
a geometry information detector for measuring geometry information of the image capture module to determine whether the image capture module is moved;
a parameter setup unit coupled to the geometry information detector for calculating geometry parameters according to the geometry information;
a primitive assembly unit for receiving the original vertex list to generate a vertex/ID flow; and
a geometry processing circuit for performing geometry transform operations over the vertex/ID flow according to the geometry parameters to generate the modified vertex list if the image capture module is moved;
wherein the geometry processing circuit comprises:
a geometry transform unit for sequentially performing the geometry transform operations over a current group of three first vertices with their data structures from the vertex/ID flow according to the geometry parameters to correct equirectangular coordinates of the three first vertices as three temporary vertices if the image capture module is moved; and
a triangle assembly unit for measuring shortest distances along θ axis among the three temporary vertices and their imaginary points to determine a transformed triangle with three second vertices as a part of the modified vertex list, wherein a difference between each temporary vertex and its corresponding imaginary point is $2\pi$ radians along θ axis;
wherein the geometry information comprises at least one of a displacement and rotation angles associated with the movement of the image capture module;
wherein the vertex/ID flow comprises a plurality of groups of three first vertices with their data structures, and each group of three first vertices form a corresponding triangle in a polygon mesh modeling the panoramic image;
wherein the modified vertex list comprises a plurality of groups of second vertices with their data structures, and each group of three second vertices form a corresponding triangle in the polygon mesh;
wherein the original vertex list comprises a plurality of third vertices with their data structures, and the calibration system conducts calibration between the plurality of camera images and the panoramic image for the plurality of third vertices to generate the original vertex list; and
wherein each of the data structures defines a corresponding vertex mapping between the plurality of camera images and the panoramic image.

28. The system according to claim 27, wherein the geometry information detector comprises:
a rotation detector for measuring the rotation angles of the image capture module;
wherein the geometry parameters comprise a rotation matrix and an inverse rotation matrix.

29. The system according to claim 27, wherein the geometry information detector comprises:
a displacement detector for measuring the displacement of the image capture module;
wherein the geometry parameters comprise the displacement.

30. The system according to claim 27, wherein the geometry processing circuit further comprises:
a pole detection unit for detecting whether the three temporary vertices surround a pole point to generate an indication signal.

31. The system according to claim 30, wherein the pole detection unit detects whether the three temporary vertices surround the pole point according to relative distances of the three temporary vertices along $\theta$ axis.

32. The system according to claim 30, wherein the vertex/ID flow further comprises IDs for the groups of three first vertices, wherein the pole detection unit detects whether the three temporary vertices surround the pole point by comparing a plurality of pre-defined IDs with an ID associated with the current group of three first vertices.

33. The system according to claim 32, wherein the parameter setup unit further performs inverse geometry transform operations over a north pole and a south pole according to the geometry parameters to generate equirectangular coordinates of two inverse pole points, and calculates which polygons with the pre-defined IDs in the polygon mesh respectively contain the two inverse pole points according to a polygon size and a width of the panoramic image to output the geometry parameters further comprising the equirectangular coordinates of the two inverse pole points and the pre-defined IDs.

34. The system according to claim 30, wherein the geometry processing circuit further comprises:
a pole parameter generation unit for performing interpolation operations over the three input vertices according to equirectangular coordinates of a desirous inverse pole point to generate a data structure of the pole point if the pole point is detected, wherein the desirous inverse pole point is a point that becomes the pole point surrounded by the three temporary vertices after the geometry transform operations are performed; and
a triangle tessellation unit for dividing the transformed triangle including the three second vertices and the pole point into multiple regrouped triangles to output regrouped vertices with their data structures for the regrouped triangles as a part of the modified vertex list if the pole point is detected;
wherein the three second vertices with their data structures are directly outputted as a part of the modified vertex list if no pole point is detected.

35. The system according to claim 34, wherein the parameter setup unit further performs inverse geometry transform operations over a north pole and a south pole according to the geometry parameters to generate equirectangular coordinates of two inverse pole points, wherein the pole parameter generation unit further selects one from the two inverse pole points as the desirous inverse pole point according to the indication signal.

36. The system according to claim 35, wherein the pole parameter generation unit is coupled between the pole detection unit and the triangle tessellation unit.

37. The system according to claim 35, wherein the geometry transform unit and the triangle assembly unit are coupled between the pole parameter generation unit and triangle tessellation unit.

38. The system according to claim 34, wherein the geometry processing circuit further comprises:
an inverse geometry transform unit coupled between the pole detection unit and the pole parameter generation unit for performing inverse geometry transform operations over one of a north pole and a south pole to generate the equirectangular coordinates of the desirous inverse pole point according to the indication signal if the pole point is detected.

39. The system according to claim 27, wherein the original vertex list is divided into a plurality of original surface vertex lists and the modified vertex list is divided into a plurality of modified surface vertex lists, and numbers of original surface vertex lists and modified surface vertex lists are equal to a number of camera images.

40. A geometry processing circuit applied in an image processing system having an image capture module and an image processing apparatus, the image capture module capturing a field of view up to 360 degrees horizontally and 180 degrees vertically to generate a plurality of camera images, the geometry processing circuit comprising:
a geometry transform unit for sequentially performing geometry transform operations over a current group of three first vertices with their data structures from a vertex/ID flow according to geometry parameters to correct equirectangular coordinates of the three first vertices as three temporary vertices when the image capture module is moved; and
a triangle assembly unit for measuring shortest distances along $\theta$ axis among the three temporary vertices and their imaginary points to determine a transformed triangle with three second vertices as a part of the modified vertex list, wherein a difference between each temporary vertex and its corresponding imaginary point is $2\pi$ radians along $\theta$ axis;
wherein the vertex/ID flow comprises a plurality of groups of three first vertices with their data structures, and each group of three first vertices form a corresponding triangle in a polygon mesh modeling the panoramic image;
wherein the modified vertex list comprises a plurality of groups of second vertices with their data structures, and each group of three second vertices form a corresponding triangle in the polygon mesh;

wherein each of the data structures defines a vertex mapping between a plurality of camera images from the image capture module and the panoramic image;

wherein the geometry parameters comprise at least one of a rotation matrix, an inverse rotation matrix and a displacement associated with the movement of the image capture module; and wherein the modified vertex list is inputted to the image processing apparatus and causes the image processing apparatus to generate a modified panoramic image.

41. The circuit according to claim 40, further comprising:
a pole detection unit for detecting whether the three temporary vertices surround a pole point to generate an indication signal.

42. The circuit according to claim 41, wherein the pole detection unit detects whether the three temporary vertices surround the pole point according to relative distances of the three temporary vertices along $\theta$ axis.

43. The circuit according to claim 41, wherein the pole detection unit detects whether the three temporary vertices surround the pole point by comparing a plurality of pre-defined IDs with an ID associated with the current group of three input first vertices.

44. The circuit according to claim 43, wherein two polygons with the pre-defined IDs in the polygon mesh respectively contain two inverse pole points.

45. The circuit according to claim 41, further comprising:
a pole parameter generation unit for performing interpolation operations over the three input vertices according to equirectangular coordinates of a desirous inverse pole point to generate a data structure of the pole point if the pole point is detected, wherein the desirous inverse pole point is a point that becomes the pole point surrounded by the three temporary vertices after the geometry transform operations are performed; and
a triangle tessellation unit for dividing the transformed triangle including the three second vertices and the pole point into multiple regrouped triangles to output regrouped vertices for the regrouped triangles with their data structures if the pole point is detected;

wherein the three second vertices with their data structures are directly outputted if no pole point is detected.

46. The circuit according to claim 45, wherein the pole parameter generation unit further selects one from two inverse pole points contained in the geometry parameters as the desirous inverse pole point according to the indication signal.

47. The circuit according to claim 46, wherein the pole parameter generation unit is coupled between the pole detection unit and the triangle tessellation unit.

48. The circuit according to claim 46, wherein the geometry transform unit and the triangle assembly unit are coupled between the pole parameter generation unit and triangle tessellation unit.

49. The circuit according to claim 45, further comprising:
an inverse geometry transform unit coupled between the pole detection unit and the pole parameter generation unit for performing inverse geometry transform operations over one of a north pole and a south pole to generate the equirectangular coordinates of the desirous inverse pole point according to the indication signal if the pole point is detected.

* * * * *